(12) United States Patent
Hughes et al.

(10) Patent No.: US 9,731,193 B2
(45) Date of Patent: Aug. 15, 2017

(54) SYSTEMS AND METHODS FOR ROSTER MANAGEMENT IN FANTASY SPORTS CONTEST APPLICATIONS

(71) Applicant: Rovi Technologies Corporation, San Carlos, CA (US)

(72) Inventors: Patrick J. Hughes, Vienna, VA (US); William Junkin, Corona Del Mar, CA (US); David Barber, Tulsa, OK (US)

(73) Assignee: Rovi Technologies Corporation, San Carlos, CA (US)

( * ) Notice: Subject to any disclaimer, the term of this patent is extended or adjusted under 35 U.S.C. 154(b) by 0 days.

(21) Appl. No.: 15/157,832

(22) Filed: May 18, 2016

(65) Prior Publication Data
US 2016/0339344 A1 Nov. 24, 2016

Related U.S. Application Data

(63) Continuation of application No. 13/940,550, filed on Jul. 12, 2013, now Pat. No. 9,358,462, which is a
(Continued)

(51) Int. Cl.
*A63F 13/828* (2014.01)
*A63F 13/20* (2014.01)
(Continued)

(52) U.S. Cl.
CPC .......... *A63F 13/20* (2014.09); *A63F 11/0074* (2013.01); *A63F 13/25* (2014.09);
(Continued)

(58) Field of Classification Search
CPC ........ A63F 13/828; A63F 13/20; A63F 13/25; A63F 11/0074; A63F 2300/8052; A63F 2011/0097
See application file for complete search history.

(56) References Cited

U.S. PATENT DOCUMENTS 4,093,223 A * 6/1978 Wilke ................. A63F 3/00028
463/31
4,918,603 A * 4/1990 Hughes .................. G09B 19/00
463/4

(Continued)

*Primary Examiner* — David L Lewis
*Assistant Examiner* — Matthew D. Hoel
(74) *Attorney, Agent, or Firm* — Ropes & Gray LLP

(57) ABSTRACT

The fantasy sports contest application of the present invention alerts the user of necessary roster changes before an upcoming fantasy sports competition. The fantasy sports contest application may evaluate the user's team roster before an upcoming fantasy sports competition to ensure that all roster spots on the team roster are filled with athletes available for real-life competitions. The fantasy sports contest application may also identify roster changes and roster transactions that may be beneficial to a user's fantasy sports contest team roster.

The fantasy sports contest application may recommend roster changes and roster transactions to the user by evaluating the performance of athletes using performance criteria. The performance criteria can be based on the past performance of athletes, either overall, or for certain situations. The performance criteria may be predefined by the system, user-editable, or any suitable combination thereof.

18 Claims, 24 Drawing Sheets

Related U.S. Application Data continuation of application No. 10/234,345, filed on Aug. 30, 2002, now Pat. No. 8,509,929.

(51) Int. Cl.
  *A63F 13/25* (2014.01)
  *A63F 11/00* (2006.01)
(52) U.S. Cl.
  CPC ... *A63F 2011/0097* (2013.01); *A63F 2300/69* (2013.01); *A63F 2300/8052* (2013.01)

(56) References Cited

U.S. PATENT DOCUMENTS

| | | | | |
|---|---|---|---|---|
| 4,977,503 A * | 12/1990 | Rudnick | ............ | G06F 15/0283 273/461 |
| 5,018,736 A * | 5/1991 | Pearson | ................ | A63F 3/081 273/460 |
| 5,263,723 A * | 11/1993 | Pearson | ................ | A63F 3/081 379/92.03 |
| 5,593,349 A * | 1/1997 | Miguel | ................ | F41J 3/00 273/371 |
| 5,713,793 A * | 2/1998 | Holte | ................ | A63F 3/081 463/1 |
| 5,769,714 A * | 6/1998 | Wiener | ................ | A63F 13/005 273/108.3 |
| 5,846,132 A * | 12/1998 | Junkin | ................ | A63F 3/081 463/42 |
| 5,971,854 A * | 10/1999 | Pearson | ................ | A63F 3/081 463/41 |
| 5,971,862 A * | 10/1999 | Yates | ................ | A63B 57/0006 473/137 |
| 6,135,881 A * | 10/2000 | Abbott | ................ | A63F 13/12 273/108.3 |
| 6,193,610 B1 * | 2/2001 | Junkin | ................ | G06Q 10/107 463/40 |
| 6,371,855 B1 * | 4/2002 | Gavriloff | ................ | A63F 13/12 463/1 |
| 6,597,960 B2 * | 7/2003 | Spector | ................ | A63B 71/06 273/440 |
| 6,669,565 B2 * | 12/2003 | Liegey | ................ | G07F 17/3288 463/1 |
| 6,775,580 B2 * | 8/2004 | Jira | ................ | A63F 9/24 463/1 |
| 7,699,701 B2 * | 4/2010 | Corbo | ................ | G07F 17/32 463/25 |
| 2002/0068633 A1 * | 6/2002 | Schlaifer | ................ | G06Q 50/34 463/43 |
| 2003/0054885 A1 * | 3/2003 | Pinto | ................ | A63F 13/12 463/42 |

* cited by examiner

Team Roster 500

Starting Line-up 510

| POS | NAME | PPG |
|-----|------|-----|
| P | Player 1 | 10.7 |
| C | Player 2 | 16.2 |
| 1B | Player 3 | 27.5 |
| 2B | Player 4 | 13.4 |
| SS | Player 5 | 12.8 |
| 3B | | |
| OF | Player 7 | 17.3 |
| OF | Player 8 | 15.8 |
| OF | Player 9 | 13.7 |

Reserves 520

| POS | NAME | PPG |
|-----|------|-----|
| 3B | Player 10 | 11.5 |
| 3B | Player 11 | 13.6 |
| 3B | Player 6* 504 | 15.9 |
| 2B | Player 12 | 11.4 |
| P | Player 13 | 9.7 |
| P | Player 14 | 10.7 |
| OF | Player 15 | 12.8 |
| OF | Player 16 | 10.5 |
| SS | Player 17 | 7.9 |

501 Recommendations (3) 503

502 Owner's Forum (5) 504

Offer Players

Recommended Players — 1310

| POS | NAME | PPG |
|---|---|---|
| P | Player 14 | 10.7 |
| C | Player 2 | 16.2 |
| 2B | Player 4 | 13.4 |
| | | |
| | | |
| | | |
| | | |
| | | |

Other Players — 1320

| POS | NAME | PPG |
|---|---|---|
| P | Player 1 | 10.7 |
| 1B | Player 3 | 27.5 |
| SS | Player 5 | 12.8 |
| 3B | Player 6 | 15.9 |
| OF | Player 7 | 17.3 |
| OF | Player 8 | 15.8 |
| OF | Player 9 | 13.7 |
| 2B | Player 12 | 11.4 |

1304 (Offer Trade)    1302 (Cancel)

FIG. 13

TRANSACTION RECOMMENDATION

2200

| TRANSACTION | TEAM | RECOMMENDATION |
|---|---|---|
| Player 1 For Player 8 | Team C | Recommended (1) |
| Player 1 For Player 9 | Team D | Recommended (2) |
| Player 1 For Player 3 | Team A | Not Recommended |
| | | |
| | | |

1610

- Accept Recommendation & Reject Other Proposals (1601)
- Edit Criteria (1602)
- Cancel (1603)

FIG. 22

SYSTEMS AND METHODS FOR ROSTER MANAGEMENT IN FANTASY SPORTS CONTEST APPLICATIONS

CROSS REFERENCE TO RELATED APPLICATIONS

This application is a continuation of U.S. patent application Ser. No. 13/940,550, filed Jul. 12, 2013, currently pending, which is a continuation of U.S. patent application Ser. No. 10/234,345, filed Aug. 30, 2002, now U.S. Pat. No. 8,509,929, issued Aug. 13, 2013 all of which are herein incorporated by reference.

BACKGROUND OF THE INVENTION

This invention relates to a fantasy sports contest application, and more particularly, systems and methods are provided to assist a user to manage a fantasy sports contest team roster in a fantasy sports contest.

Athletic endeavors have long supported a broad range of secondary competitions which include wagering on the outcome of particular games and wagering on the performance of a particular player.

In known fantasy sports contests, the user selects a roster, a team, a particular individual, or a group of individuals in an athletic contest. The user of a fantasy sports contest system is given the ability to take on the role of a fictional general manager with powers which may include the ability to draft, trade, dismiss and otherwise manage the player or players on the user's fantasy sports team.

Conventionally, the rules in a fantasy sports contest are set by a fantasy sports contest system provider, or are set by a league commissioner who sets the rules under which a group of fantasy or rotisserie sports contest users compete against each other. For example, for every goal scored in real-life by a member of the user's fantasy soccer team, a conventional fantasy sports contest system might award five fantasy points to the user in the fantasy competition.

The fantasy sports contest system provider may also provide additional services, which include providing statistical information on real-life games and players, tracking users' scores in the fantasy contest, and enabling transactions and other interactions among the users.

A fantasy sports contest may be based on a variety of real-life athletic events, and typically involves selecting players from real-life team sports (e.g., football, baseball, basketball, hockey, soccer or rugby), selecting players from real-life sports where individuals compete (e.g., golf, tennis or automotive racing), or selecting participants from competitions involving animals (e.g., horse and dog racing). The user's selections are typically stored in the user's fantasy sports contest roster. The performance of these selections in real-life competition determines the user's performance in the fantasy sports competition.

A fantasy sports contest goes beyond traditional one-time wagering systems (e.g., selecting picks for the winners of a weekend's football games or picking who will win a most valuable player award).

In fantasy sports, the performance of the user's fantasy sports contest team is determined by the real-life performance of athletes on the user's fantasy sports contest team roster. Accordingly, the effective management of a fantasy sports contest team roster is the key to success in fantasy sports contests. Conventional fantasy sports contest systems offer little assistance to the user for managing a fantasy sports contest team roster beyond providing a skeletal apparatus for enabling and updating roster changes and transactions. This can have a detrimental effect on the enjoyment of fantasy sports contest users, especially novice or casual users. For novice or casual users, time commitment required to properly manage a fantasy sports contest team roster can lead to a loss of interest in the fantasy sports contest.

It would therefore be desirable to present a fantasy sports contest system that actively aids the user in managing a fantasy sports contest team roster.

SUMMARY OF THE INVENTION

In view of the foregoing, it is therefore an object of the present invention to provide a user with a fantasy sports contest application having improved roster management features.

This and other objects are accomplished in accordance with the principles of the present invention by providing a fantasy sports contest application that identifies roster changes and roster transactions that may be beneficial to the user's fantasy sports contest team roster.

The fantasy sports contest application of the present invention may be implemented on any suitable platform, or on any suitable combination of platforms. For example, in an interactive television system, the fantasy sports contest application may be implemented using a multichannel set-top box receiver, a television capable of running software programs, a two-way remote control, any other suitable device or any suitable combination of devices.

The fantasy sports contest application of the present invention may access data from a statistical database and a contest database. The statistical database may store up-to-date information and statistics for all real-life athletes used in a fantasy sports contest. The contest database may store fantasy sports contest information, such as team roster information, contest schedules, and contest rules.

In one embodiment of the present invention, the fantasy sports contest application may aid the user by identifying necessary changes to the user's fantasy sports contest team roster. In one suitable approach, the fantasy sports contest application may evaluate the user's team roster before an upcoming round of the fantasy sports contest to ensure that all roster spots on the team roster are filled with athletes available for competition in real-life contests. An available athlete being an athlete that is physically able to compete in a real-life contest, and who is scheduled to compete in a real-life contest. If any roster spots on the user's team roster are empty, or if an athlete on the user's team roster is unavailable (e.g., due to injury, bye-weeks, etc.) for competition, the fantasy sports contest application may alert the user via an automatically generated message. If the user does not respond to the alert message, the fantasy sports contest application may automatically remedy the situation to prevent the loss of performance for the user's fantasy sports contest roster.

In one suitable approach, the fantasy sports contest application may recommend roster changes to the user by evaluating the performance of athletes on the team roster. The fantasy sports contest application may evaluate the performance of all athletes on the user's team roster using performance criteria. The performance criteria can be based on the past performance of athletes, either overall, or for certain situations. The performance criteria may be predefined by the system, user-editable, or any suitable combination thereof. For example, if the fantasy sports contest application identifies an athlete in reserve who, according to performance criteria, may perform better in the next competition than the athlete currently in the starting line up, the fantasy sports contest application may generate a recommendation message for display to the user detailing the recommended roster change and the reasoning behind the change. Similarly, the fantasy sports content application may evaluate a pool of athletes discarded by other teams, or that are otherwise freely available to the user, and generates a recommendation message to the user when the fantasy sports contest application identifies an athlete outperforming an athlete on the user's team roster.

In one suitable approach, the fantasy sports contest application may provide fantasy sports contest users with recommended roster transactions. Within a group of the fantasy sports contest in which the trading of athletes is allowed between users (e.g., a fantasy sports contest league), the fantasy sports contest application may evaluate users' team rosters using performance criteria to identify recommended roster transactions. In one suitable approach, a roster transaction recommended by the fantasy sports contest application may be deemed, using performance criteria, to be mutually beneficial to both fantasy sports contest team involved. In which case the fantasy sports contest application may automatically generate a recommendation message for display to both users proposing the recommended roster transaction. In another suitable approach, the fantasy sports contest application may recommend roster transactions to the user that take into consideration only the user's fantasy sports contest team's interests.

In one embodiment of the present invention, the fantasy sports contest application further may provide an instant messaging feature having roster management tools. The fantasy sports contest application may provide instant messaging between users within a competitive field (e.g., a fantasy sports contest league). In addition, the fantasy sports contest application may provide access to roster management tools within the instant messaging interface that allow users to propose and complete roster transactions. In one suitable approach, the fantasy sports contest application may provide the user with recommendations concerning roster transactions with other users. In another suitable approach, the fantasy sports contest application may store a history of roster transaction information in a message box. It should be understood that the roster management tools implemented using the instant messaging interface may also be provided using a personal computer, a cellular phone, a PDA, or any other suitable communications device.

In one suitable approach, a group of users may communicate with each other using voice communications devices. The fantasy sports contest application may enable one of the users, having access to the fantasy sports contest application, to propose and transmit trades involving two or more of the users' fantasy sports contest team rosters. For example, the proposed trades may be transmitted to wireless access protocol ("WAP") enabled devices, or other devices capable of running applets or other programs. From such a device, the user may press a button or otherwise indicate whether he or she wishes to accept or decline the proposed trade. Such selection being transmitted back to the fantasy sports contest application. Alternatively, the users may call into the fantasy sports contest application, which may be equipped with interactive voice response ("IVR") technology enabling one or more users to access roster management tools.

Further features of the invention, its nature, and various advantages will be more apparent from the accompanying drawings and the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 shows an illustrative team roster screen showing a roster spot vacated by an unavailable athlete along with available replacement athletes in accordance with one embodiment of the present invention;

FIG. 13 shows an illustrative display screen that enables the user to offer players in a roster transaction in accordance with one embodiment of the present invention;

FIG. 22 shows an illustrative display screen for a transaction recommendation feature that evaluates multiple trade proposals for the same athlete in accordance with one embodiment of the present invention;

DETAILED DESCRIPTION OF PREFERRED EMBODIMENTS

Figure 1:
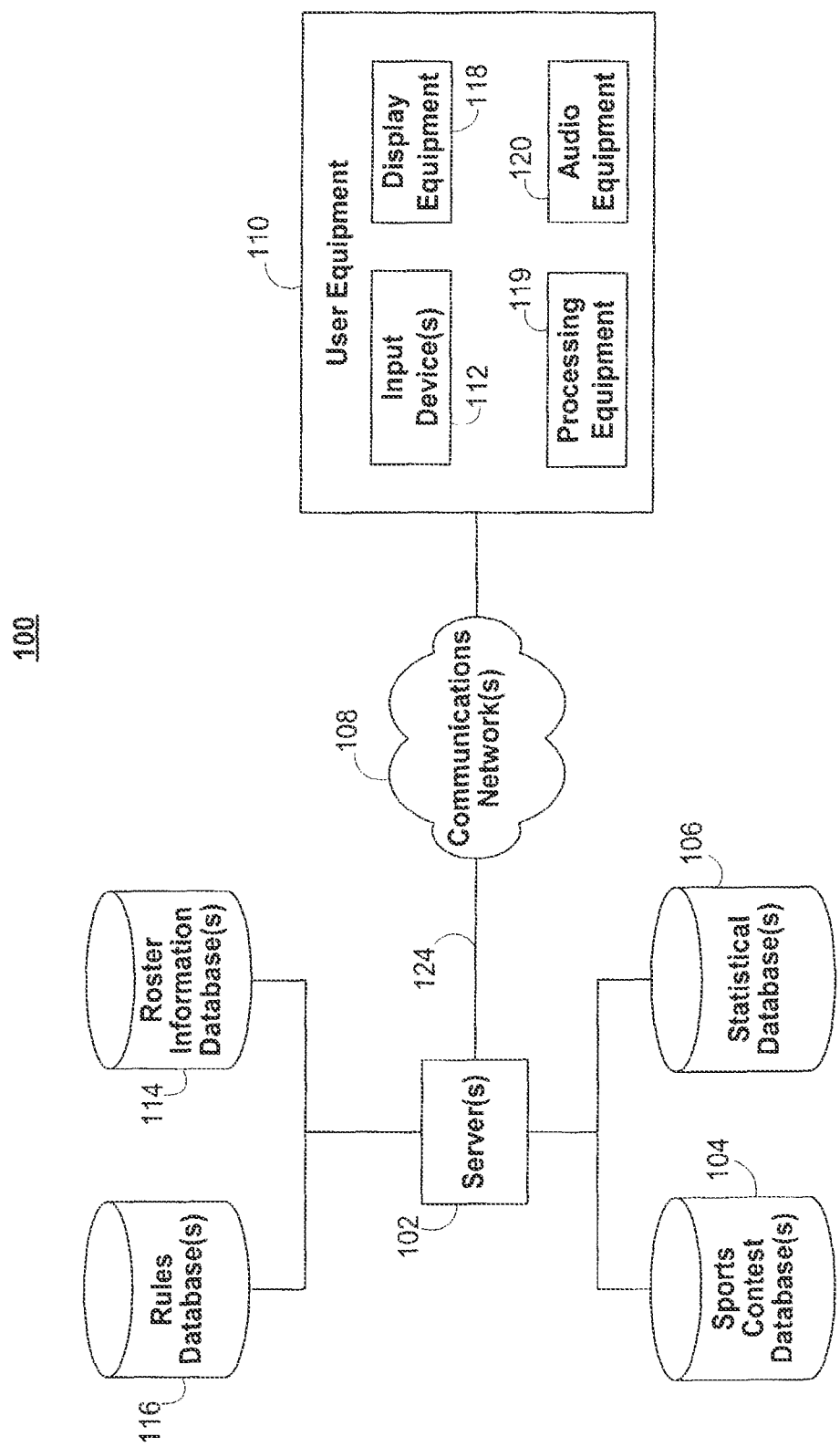
FIG. 1 is a diagram of an illustrative fantasy sports contest system in accordance with one embodiment of the present invention.

The present invention is primarily described herein in terms of the fantasy sports contest application. It will be understood that any other suitable software, hardware, or both may be used in conjunction with the fantasy sports contest application or in place of the fantasy sports contest application to implement some or all of the features of the present invention.

The fantasy sports contest application of the present invention may be any suitable software, hardware, or both that may be used to implement the features of the present invention. The fantasy sports contest application may be implemented at any suitable location in the system described in FIG. 1. For example, the fantasy sports contest application may be implemented at user equipment 110, at server 102, or at any other suitable location (that is not necessarily shown in FIG. 1), or at any combination of locations. For example, certain portions of the fantasy sports contest application may be implemented at user equipment 110 (e.g., those portions that implement features involved in user interaction), whereas certain other portions of the fantasy sports contest application may be implemented at server 102 (e.g., those portions that implement features involved in the processing of client requests and in the tracking of the performance of contestants). Any such suitable arrangement of the fantasy sports contest application may be implemented in accordance with the present invention.

The fantasy sports contest application of the present invention may be used to implement fantasy sports contests that include any suitable sports contest in which the user is given the ability to make decisions that may affect the standing of the user in the sports contest. For example, in typical team-oriented fantasy sports contests, the user may participate in the capacity of a general manager. In this situation, the user may be have responsibilities such as creating a team roster (e.g., drafting players), selecting player positions, selecting reserves, making trades, and otherwise maintaining the composition of the user's team roster. It will be understood that any other suitable decision-making capability may be given to the user in a fantasy sports contest in addition to or in place of those indicated above.

The fantasy sports contest of the present invention need not be limited or restricted in time. For example, a fantasy sports contest may last an entire season, multiple seasons, a portion of the season, a definite period of time (e.g., one month, two weeks, three days, one hour, etc.), the duration of a particular event (e.g., Wimbledon, etc.), a portion of a particular event, or any other suitable period of time.

In one suitable approach, fantasy sports contests may include contests in which the user is not necessarily playing the role of a general manager. For example, fantasy sports contests may involve the user determining or guessing (i.e., blindly or with calculation) whether particular outcomes will occur (e.g., whether a particular golfer will make the next put). Any such suitable decision-making may be the basin of a fantasy sports contest or a part of a fantasy sports contest.

The fantasy sports contests of the present invention may use any suitable one or more scoring systems. For example, existing fantasy scoring systems include straight point systems (e.g., points are awarded and subtracted based on real-life plays without regard to the performance of other players on other fantasy teams in a league), rotisserie systems (e.g., points are awarded based on the user's relative ranking against other users), head-to-head systems (e.g., users in a league are matched against one another in a round-robin series of one-on-one contests during the course of a season). There are merely illustrative scoring systems. Any other suitable scoring system may be used in the fantasy sports contests of the present invention.

It will be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

The fantasy sports contest application of the present invention may provide to the user fantasy sports contest information. Fantasy sports contest information may include any suitable information associated with one or more fantasy sports contests in which the user participates or in which the user may have an interest. For example, fantasy sports contest information may include information regarding the user's one or more rosters, the user's standing in each of the fantasy sports contests in which the user participates, one or more point tallies that the user has accumulated in each of the user's respective fantasy sports contests, information regarding the number of trades the user may make, information regarding the amount of fantasy money the user has available to add players to a roster, information regarding deadlines to make trades or perform any other suitable task associated with one or more fantasy sports contests, or any other suitable information. Fantasy sports contest information may also include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events that may have an affect on the one or more fantasy sports contest in which the user participates.

Aspects of the operation of fantasy sports contest applications are described in U.S. Pat. No. 4,918,603 (Hughes, et al.), U.S. Pat. No. 5,846,132 (Junkin), U.S. Pat. No. 5,971,854 (Junkin), and U.S. Pat. No. 6,193,610 (Junkin), which are all hereby incorporated by reference herein in their entireties.

An illustrative fantasy sports contest system 100 in accordance with the present invention is shown in FIG. 1. A fantasy sports contest application may be at least partially implemented on server 102 in system 100. Server 102 may include any suitable one or more servers. For example, server 102 may include personal computers, high-capacity data storage servers, mainframe computers, computer networks (e.g., local area network, wide area network, intranet, etc.). Server 102 may access one or more databases (e.g., databases 104, 106, 114, and 116) that may be used to store information related to fantasy sports.

Databases 104, 106, 114, and 116 may reside on server 102, may partially reside on one ore more servers 102, or may reside remote to server 102. Databases 104 may be used to store information relating to the fantasy sports contest, such as competition schedules, standings, and any other information related to the fantasy sports contest. Database 106 may be used to store real-life statistical information, fantasy sports contest statistical information, or other statistical information in relation to the fantasy sports contest. Database 114 may be used to store roster information such as the athletes on each fantasy sports contest team roster and information related to each athlete's upcoming contests and past performances. Database 116 may be used to store information on rules of the fantasy sports contest.

The user of a fantasy sports contest application may communicate with server 102 over communications network 108. Communications network 108 may include any suitable communications network. For example, communications network 108 may include a satellite link, a telephone network link, an Internet link, a cable or fiber optic link, a microwave link, a combination of such links, or any other suitable communications path. Communications network 108 may include any suitable routers, proxies, any other suitable devices, or any combination thereof (e.g., gateway servers, domain name servers, Internet service provider proxy servers, etc.).

The fantasy sports contest information transmitted by server 102 to user equipment 110 includes data communicated to users as part of the fantasy sports contest such as statistical information, rosters, standings, etc. If desired, some of the fantasy sports contest information may be provided using data sources at facilities other than server 102, and which are directly connected to user equipment 110 via communications network 108.

Server 102 may distribute the fantasy sports contest application and related data, as well as fantasy sports contest information to user equipment 110 via communications network 108.

User equipment 110 at each user's location may include processing equipment 119. Processing equipment 119 may be based on a personal computer, a WebTV box, a personal computer television (PC/TV), a handheld computing device, etc. Processing equipment 119 may be used to implement the fantasy sports contest application at the user's location. Alternatively, the fantasy sports contest application may be partially implemented on server 102 and partially implemented on processing equipment 119.

A number of suitable techniques may be used to distribute fantasy sports contest information. For example, fantasy sports contest information may be distributed from server 102 in a continuously-looped arrangement, where the fantasy sports contest application implemented on user processing equipment 119 may capture appropriate fantasy sports contest information for display from the stream of fantasy sports contest information being transmitted. With such a continuously-looped arrangement, a map indicating the location of the latest fantasy sports contest information may be downloaded periodically to user equipment 110. This allows any databases used in server 102 for storing fantasy sports contest information to be updated. Fantasy sports contest information may be downloaded to user equipment 110 periodically and stored locally. The fantasy sports contest information may be accessed locally when needed by the fantasy sports contest application implemented (at least partially) using processing equipment 119 at the user's location. Another suitable approach involves using the fantasy sports contest application to request fantasy sports contest information as needed. Information on the location of fantasy sports contest information may be downloaded to user equipment 110, and may be updated as needed. The fantasy sports contest application implemented (at least partially) using processing equipment 119 may then request and receive, as needed, appropriate fantasy sports contest information.

At the user's location, display equipment 118 may display to the user screens generated by the fantasy sports contest application having fantasy sports contest information. The fantasy sports contest information may include audio information. Audio equipment 120 may be used to output audio information. Audio equipment may include speakers found in televisions, speakers for personal computers, cellular phones, PDAs, tablet PCs, or any other suitable audio equipment. The user may use input device 112 to access the fantasy sports contest application. Such input devices may include one or more suitable devices such as remote controls, keyboards, voice controlled devices, track balls, computer mice or any other suitable device.

Certain functions such as the user's instructions to make a change in the user's fantasy sports contest team roster may require user equipment 110 to transmit data to server 102 over communications network 108. If desired, such data may be transmitted using a communications network separate from communications network 108. If functions such as these are provided using communications networks separate from communications network 108, some communications originating from user equipment 110 may be made directly with the separate networks.

Figure 2:
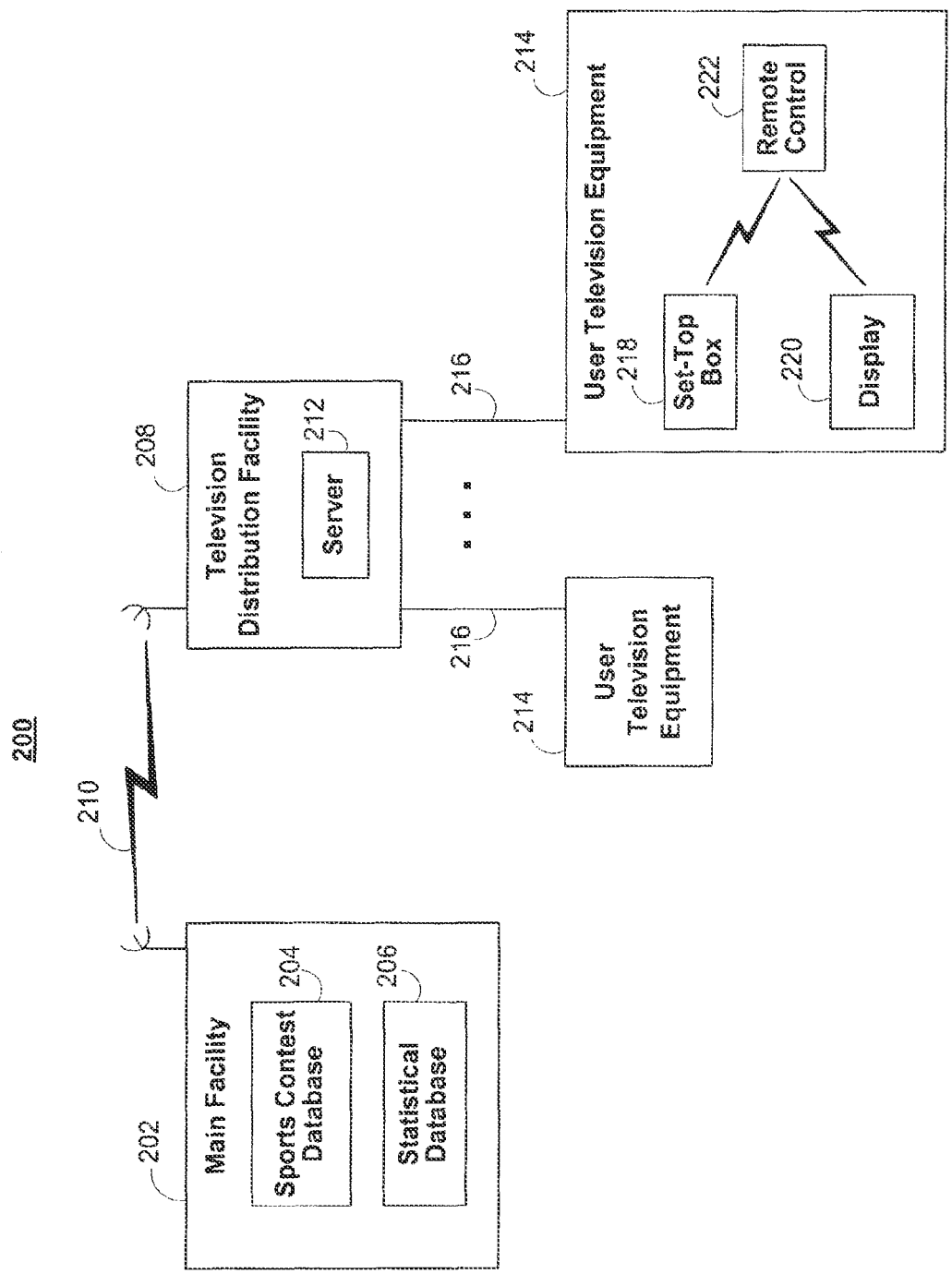
FIG. 2 is a diagram of an illustrative fantasy sports contest television system in accordance with one embodiment of the present invention.

In one embodiment, the fantasy sports contest application of the present invention may be implemented on an interactive television platform. An illustrative fantasy sports television system 200 in accordance with this embodiment of the present invention is shown in FIG. 2. Main facility 202 may include a fantasy sports contest database 204 for storing fantasy sports contest information such as the roster of players available for drafting, the schedule for the contest, rules, or any other suitable contest information. Main facility 202 may also include a statistical database 206 for storing real-life and fantasy statistics on a pool of athletes used in a fantasy sports contest. Information from databases 204 and 206 may be transmitted to television distribution facility 208 via communications link 210. Link 210 may be a satellite link, a telephone network link, an Internet link, a cable or fiber optic link, a microwave link, a combination of such links, or any other suitable communications link.

The fantasy sports contest information transmitted by main facility 202 to television distribution facility 208 includes data which is communicated to users as part of the contest such as statistical information, rosters, standings, etc. If desired, some of the contest information may be provided using data sources at facilities other than main facility 202. For example, data related to tracking player interaction with the contest application and other applications may be communicated to a data collection location that is separate from main facility 202 and separate from television distribution facility 208.

Television distribution facility 208 may distribute the fantasy sports contest application and fantasy sports contest information to user television equipment 214 or other user equipment of multiple users via communications paths 216. This information may be distributed over an out-of-band channel on paths 216 and may be distributed using any of a number of suitable techniques. For example, still images and text may be distributed over an out-of-band channel using an out-of-band modulator.

Each user may have a receiver such as set-top box 218 or other suitable television or computer equipment into which circuitry similar to set-top box circuitry has been integrated. For clarity, the present invention is described primarily in connection with user equipment based on a set-top box arrangement. This is merely illustrative. The fantasy sports contest application may be implemented using user television equipment 214 that is based on a personal computer, a WebTV box, a personal computer television (PC/TV), or handheld computing device, etc. If desired, the fantasy sports contest application may be implemented using a client-server architecture using user television equipment 214 as a client processor and a server such as server 212.

Communications path 216 preferably has sufficient bandwidth to allow television distribution facility 208 to distribute scheduled television programming, pay programming, and other information to set-top boxes 218 in addition to the fantasy sports contest application and related information. Multiple television and audio channels (analog, digital, or both analog and digital) may be provided to set-top boxes 218 via communications path 216. If desired, fantasy sports contest information may be distributed by one or more distribution facilities that are similar to, but separate from, television distribution facility 208 using communications paths that are separate from communications path 216 (e.g., using Internet paths).

Certain functions such as the user's instructions to make a change in his roster choices may require set-top boxes 218 to transmit data to television distribution facility 208 over communications path 216. If desired, such data may be transmitted over telephone lines or other separate communications paths. If functions such as these are provided using facilities separate from television distribution facility 208, some of the communications involving set-top box 218 may be made directly with the separate facilities.

The fantasy sports contest application of the present invention may also be implemented on an on-line system using personal computers or other suitable equipment linked to a computer network (e.g., the Internet), an interactive application interface (e.g., an Internet browser). With such an arrangement, the fantasy sports contest application and related information may be stored remotely on a server that the user of the on-line fantasy sports contest application may access through an Internet connection and may download locally. Server 212 need not be incorporated in a television distribution facility, the communication path 216 could be an Internet connection and a basic personal computer with a browser or other suitable equipment could substitute for user television equipment client processor 214.

A number of suitable techniques may be used in the fantasy sports television system to distribute fantasy sports contest information. For example, if communications path 216 includes a number of traditional analog television channels, one or more of these channels may be used to support a number of digital channels. The bandwidth of each analog channel that is used to support digital channels may support ten or more of such digital channels. Set-top box 218 and server 212 may negotiate to determine a channel on which to provide the desired information. Fantasy sports contest information that originates from main facility 202 or a separate facility may be distributed to user television equipment 214 using these or other suitable techniques or a combination of such techniques.

Fantasy sports contest information may be downloaded periodically (e.g., every 30 minutes) to set-top box 218 and stored locally. The fantasy sports contest information to store may be based on those athletes that relate to the user's team roster. The fantasy sports contest information may be accessed locally when needed by the fantasy sports contest application implemented, at least partially, using the set-top box 218. Alternatively, fantasy sports contest information may be provided in a continuously-looped arrangement on one or more digital channels on communications path 216. With such a continuously looped arrangement, a map indicating the location of the latest fantasy sports contest information may be downloaded periodically to set-top box 218 (e.g., every thirty minutes). This allows the content on the digital channels to be updated. The fantasy sports contest application implemented (at least partially) on set-top box 218 may use the map to locate desired fantasy sports contest information on the digital channels.

During use of the fantasy sports contest application implemented on set-top box 218, information relating to the fantasy sports contest may be displayed on display 220. Set-top box 218, and display 220 (if part of a television) may be controlled by one or more remote controls 222 or any other suitable user input interfaces such as a wireless keyboard, mouse, trackball, dedicated set of buttons, etc.

Another suitable approach involves using a server such as server 212 or server 304 (FIG. 3) to provide fantasy sports contest information on request (e.g., after set-top box 218 and server 212 or server 304 have negotiated to set up a download operation). If desired, server 212 or server 304 may provide instructions to set-top box 218 on where the desired fantasy sports contest information may be located on a server, a database, or a particular digital channel. The fantasy sports contest information may be updated periodically if the server that is responsible for providing the instructions for informing the set-top box of the location of the fantasy sports contest information is also updated periodically.

Figure 3:
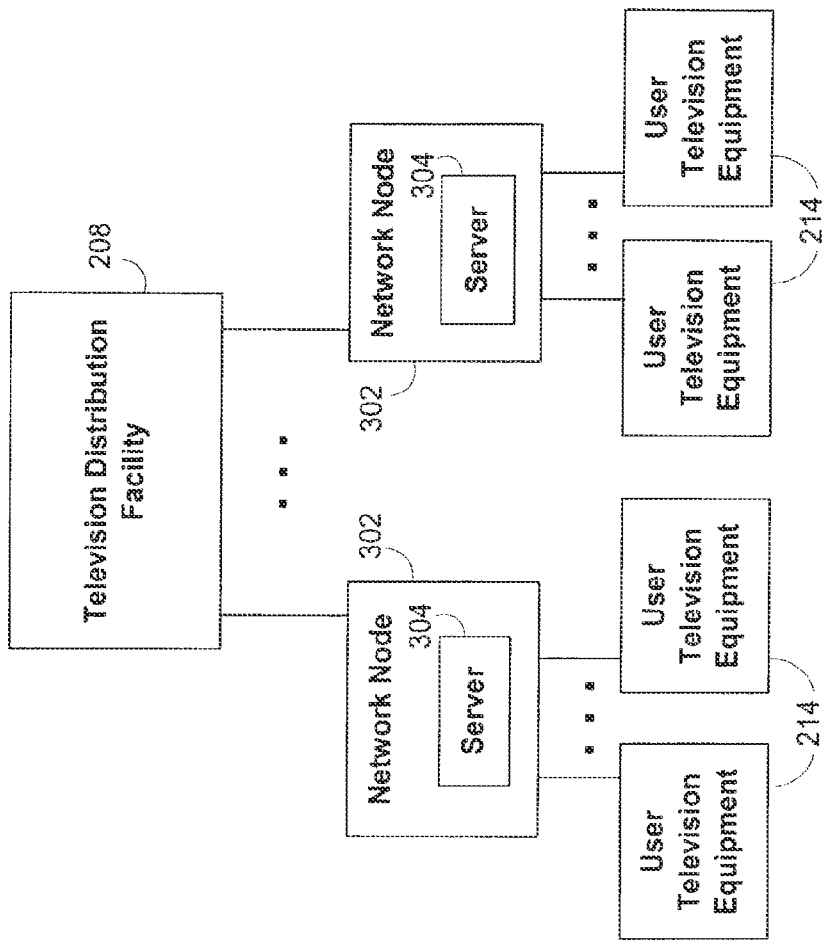
FIG. 3 is a diagram of an illustrative fantasy sports contest television system having network nodes in accordance with one embodiment of the present invention.

As shown in FIG. 3, the capabilities of server 212 may be provided using servers 304 located at network nodes 302. Servers such as servers 304 may be used instead of server 212 or may be used in conjunction with server 212 located at television distribution facility 208.

A cable modem may be used to distribute text, graphics, audio and video information. The text, graphics, audio and video information may also be distributed using a combination of these techniques or any other suitable technique.

In one embodiment of the present invention, the fantasy sports contest application may alert the user of necessary changes in the user's fantasy sports contest team roster. In one suitable approach, the fantasy sports contest application may evaluate the user's team roster before the start of an upcoming round of the fantasy sports contest to ensure that each roster spot affecting the performance of the user's fantasy sports contest team is filled with an available athlete. An available athlete being an athlete physically able to perform in a real-life competition, and who is scheduled to be on his or her team's active roster in a real-life competition. By evaluating the user's fantasy sports contest roster before each round of the fantasy sports contest, the fantasy sports contest application ensures that empty roster spots (e.g., in a starting lineup), or unavailable athletes (e.g., due to injury, suspension, bye-week, etc.), will not adversely affect the performance of the user's fantasy sports contest team in the upcoming round of the fantasy sports contest.

In one suitable approach, the fantasy sports contest application may evaluate the user's team roster at one preset time or at multiple preset times (e.g., one hour, eight hours, one day) before the start of each round of the fantasy sports contest. In another suitable approach, the fantasy sports contest application may alert the user whenever a roster spot on the user's team roster becomes empty or whenever an athlete on the user's team roster becomes unavailable (e.g., due to injury). In another suitable approach, the fantasy sports contest application may alert the user of necessary roster changes within a band of time (e.g., four hours) before the start of the upcoming round of the fantasy sports contest.

Figure 4:
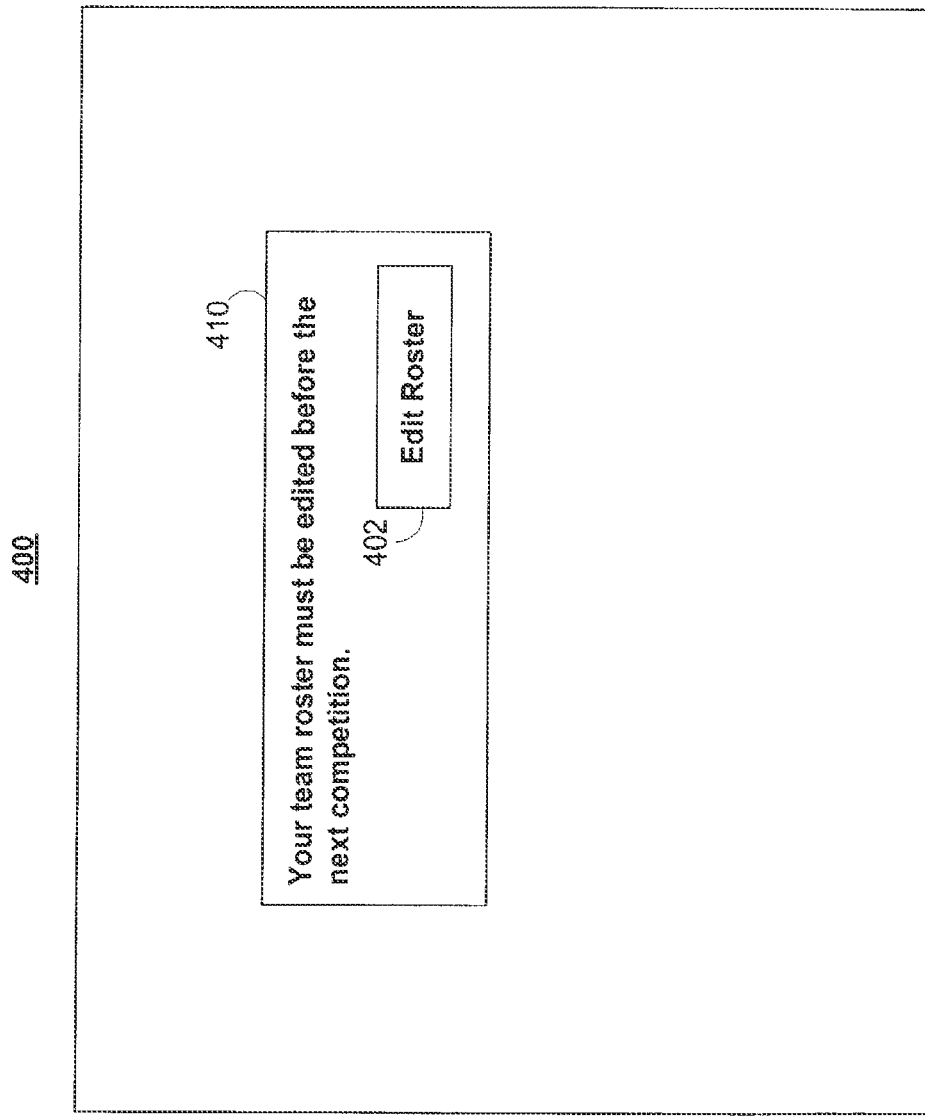
FIG. 4 shows an illustrative message alerting the user of necessary changes to be made in the user's team roster in accordance with one embodiment of the present invention.

As illustrated by FIG. 4, the fantasy sports contest application may display alert message 410 to the user if the fantasy sports contest application determines that a change must be made in the user's fantasy sports contest team roster. Alert message 410 may be displayed to the user when the fantasy sports contest application is invoked, and may prevent the user from taking any other actions in the fantasy sports contest application before resolving the necessary roster change. The fantasy sports contest application may provide selectable element 402 in alert message 410. Upon user selection of selectable element 402, the fantasy sports contest application may display a screen that enables the user to make the necessary or advisable roster change to the user's team roster. In other suitable approaches, the user may be alerted of necessary or advisable roster changes by an electronic mail message, a telephone call, an alphanumeric pager message, any other suitable method of communicating with the user, or any suitable combination of methods.

An illustrative team roster screen is shown in FIG. 5. As shown in FIG. 5, the fantasy sports contest application has automatically removed an unavailable athlete from starting lineup 510, and highlighted the vacant roster spot. The fantasy sports contest application may also highlight in reserves roster 520 any replacement athletes that are available for placement into starting lineup 510. In this example, the starting third baseman, player 6, is unavailable for competition. Player 6's unavailable status is represented by indicator 504 (e.g., an asterisk) next to the player's name. Player 6's spot in starting lineup 510 has been automatically vacated and available replacement third basemen, players 10 and 11, are highlighted in reserves roster 520 for selection. Athletes who are not third basemen or are not available for placement in player 6's vacated roster spot are indicated in FIG. 5 by gray shading. A plurality of methods exist for indicating the status of an athlete, including the use of highlights, colors, varying fonts, symbols, etc. Any or all of these methods may be used in the present system to indicate availability and eligibility status.

If the user fails to make the necessary changes in the user's team roster, the fantasy sports contest application may automatically make the necessary or advisable roster changes using eligible replacement athletes at a preset time (e.g., one minute) before the start of the fantasy sports contest. In the case where more than one eligible replacement athlete is available for one roster spot, the fantasy sports contest application may also determine which of the replacement athletes to place into the starting lineup using its own evaluation criteria. For example, the fantasy sports contest application may compare the performance of the eligible replacement athletes using real-life statistics, fantasy sports contest statistics, or a combination thereof, to determine which replacement athlete should be placed into a vacant roster spot.

Figure 6:
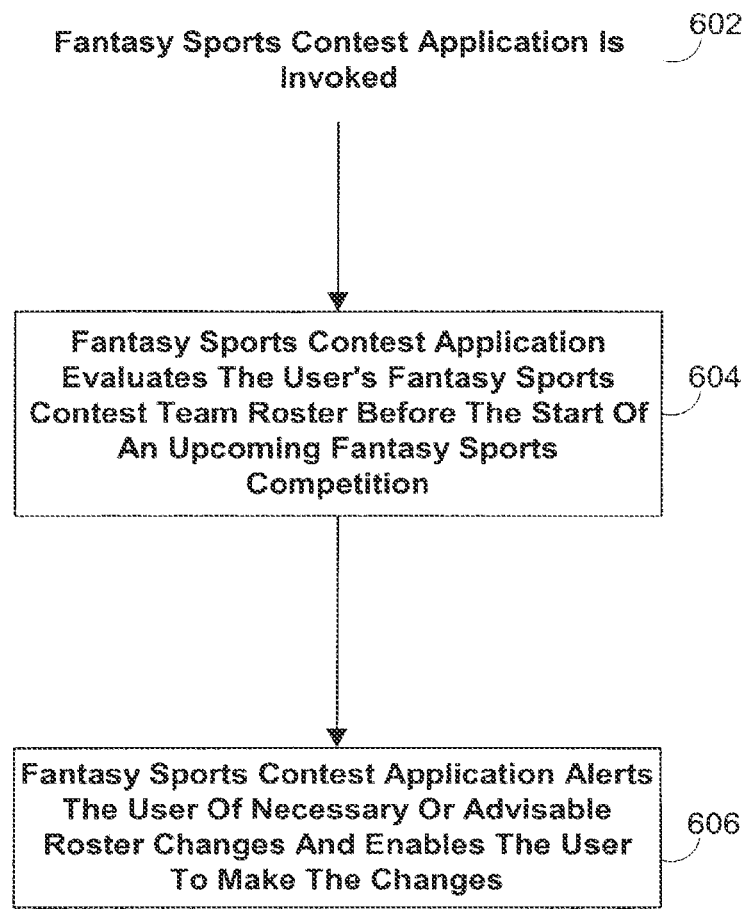
FIG. 6 is a flow chart of illustrative steps involved in alerting the user of necessary changes in the user's team roster in accordance with one embodiment of the present invention.

FIG. 6 is a flow chart of illustrative steps for alerting the user of necessary or advisable changes to the user's fantasy sports contest team roster. At step 602, the fantasy sports contest application is invoked. At step 604, the fantasy sports contest application evaluates the user's fantasy sports contest team roster before the start of an upcoming round of the fantasy sports contest to ensure that all roster spots affecting the performance of the user's fantasy sports contest team (e.g., roster spots in a starting lineup) are filled with available athletes. At step 606, if the fantasy sports contest application finds necessary or advisable changes to the user's fantasy sports contest team roster, then the fantasy sports contest application may alert the user (e.g., the next time the user invoices the fantasy sports contest application) and enable the user to make the necessary or advisable changes.

In one embodiment of the present invention, the fantasy sports contest application seeks to improve the performance of the user's fantasy sports contest team roster by identifying beneficial roster changes and roster transactions to the user. Roster changes being rearrangements of athletes already on the user's team roster, and roster transactions being trades involving the exchange of athletes from one team roster to other team rosters.

In order to produce intelligent recommendations, the fantasy sports contest application may use a uniform system for quantifying and evaluating the performance of an athlete. The following example of such a system is provided for illustrative purposes only, and any suitable system for evaluating athletic performance may be used in the fantasy sports contest application of the present invention. The present illustrative system uses real-life athletic statistics as the basis for evaluating athletic performance. A statistical database, such as database 206, may include detailed and updated statistics on all athletes used in the fantasy sports contest. These detailed statistics form a numerical representation of an athlete's performance over his entire career and may be available from an outside source (e.g., Major League Baseball™).

Using detailed statistical information, the fantasy sports contest application may evaluate an athlete's performance using a plurality of performance criteria. The performance criteria may be used to target particular statistical information for determining a particular type of athletic performance. For example, one particular performance criteria may target the performance of an athlete in the past ten real-life contests, thereby limiting the statistical information used for evaluation purposes to the statistics generated from the past ten real-life contests. Another particular performance criteria may target an athlete's performance against left-handed pitchers, thereby limiting the statistical information used for evaluation to statistics generated by the athlete against left-handed pitchers. The use of performance criteria may provide useful insights on an athlete's strengths and weaknesses that are difficult to discern from general statistical information.

Using the targeted statistical information produced using performance criteria, the fantasy sports contest application may apply a system for weighting the statistical information that is substantially equivalent to the system used to convert real-life statistics to fantasy sports contest points in the fantasy sports contest. For example, five fantasy points may be awarded for a home run, one fantasy point for a run batted in, etc. This result may then be averaged to more accurately compare an athlete's performance against the performance of other athletes.

Figure 7:
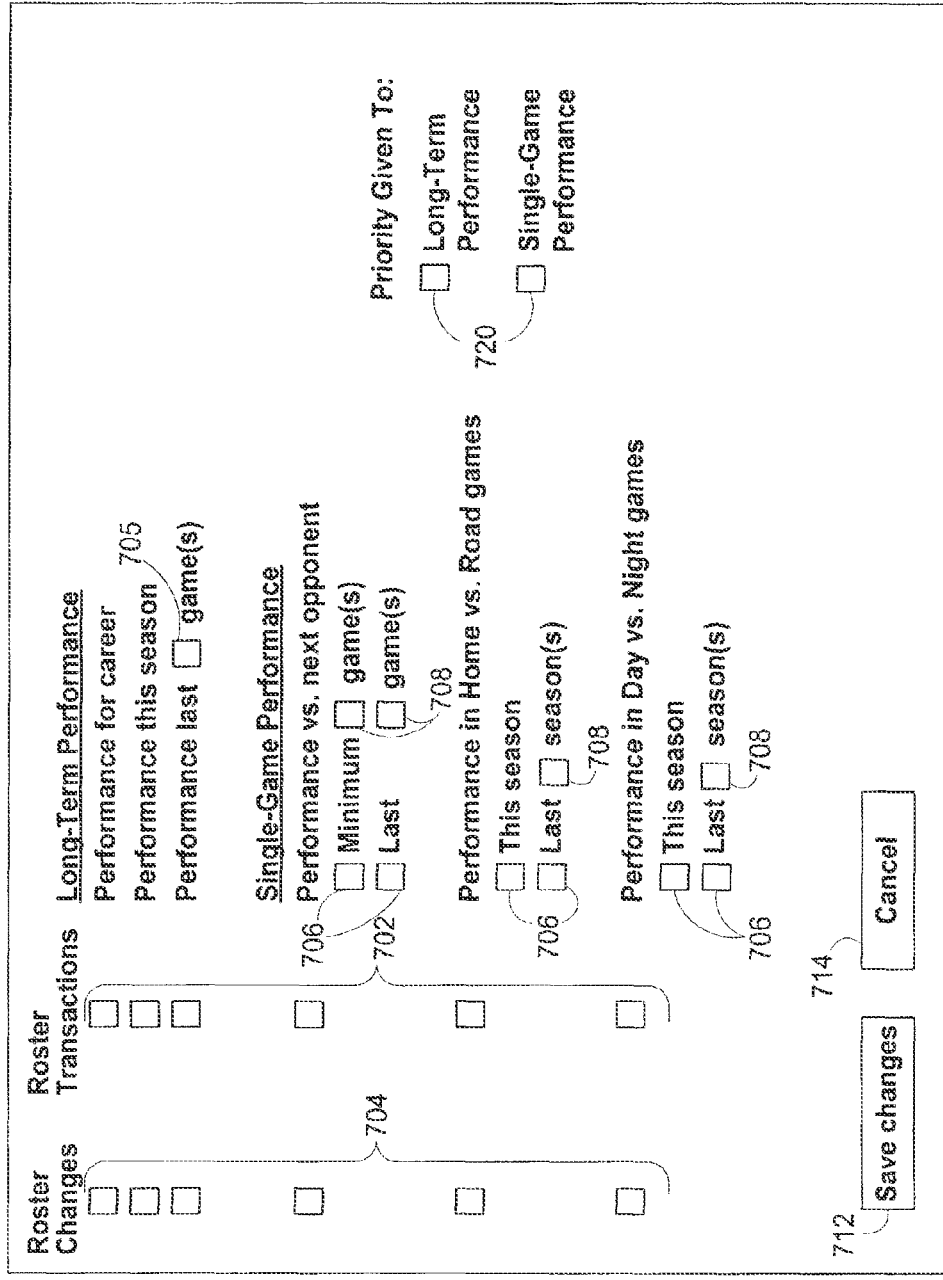
FIG. 7 shows an illustrative display screen that enables the user to select and edit performance criteria used by the fantasy spores contest application to generate roster recommendations in accordance with one embodiment of the present invention.

Variations of performance criteria are vast, and the performance criteria used by the fantasy sports contest application may be pre-programmed, may be selected and edited by the user, or may be provided in any other suitable manner. An illustrative screen for selecting and editing the performance criteria to be used by the fantasy sports contest application is shown in FIG. 7. As seen in FIG. 7, performance criteria to be used for recommending roster changes within the same team roster and performance criteria to be used for recommending roster transactions with other team rosters are selected separately using elements 704 and 702, respectively. Elements 708 and 706 may be used by the user to edit performance criteria. Alternatively, the fantasy sports contest application may be pre-programmed with a set of performance criteria for use in comparing athletic performance.

In one suitable approach, the fantasy sports contest application may restrict the number of performance criteria used to recommend roster changes and roster transactions to a single performance criteria. Alternatively, the fantasy sports contest application may enable the use of a plurality of performance criteria.

In order to evaluate athletic performance in the context of fantasy sports, real-life statistics may be converted into fantasy sports contest scoring information according to the rules of the fantasy sports contest. Alternatively, the fantasy sports contest application may use rules or methods for converting real-life statistics to fantasy sports contest scoring information that are different from the rules or methods used in the fantasy sports contest. Using fantasy sports contest scoring information generated from the real-life statistics, the fantasy sports contest application may generate a performance score for each corresponding performance criteria using the statistics targeted by the performance criteria. Preferably, the performance scores are in the form of averaged scores that are easily compared.

In one suitable approach, the fantasy sports contest application may use performance scores to generate intelligent recommendations on changes to the user's fantasy sports contest team roster. Performance scores are calculated using statistics of past performance and may only serve as a reasonable predictor of future performance. One particularly advantageous practice is to, continually or periodically, compare athletes in the starting lineup (e.g., lineup of athletes impacting a fantasy sports contest) of the user's team roster against athletes in the reserve lineup of the user's team roster before each round of the fantasy sports contest. Using performance scores, the fantasy sports contest application may compare each starting athlete with the reserve athletes eligible to replace the starting athlete.

In one suitable approach, the fantasy sports contest application may compare athletes by using, in parallel or in series, performance criteria that are specifically relevant to the athletes' real-life contests during the user's next round of competition in the fantasy sports contest. For example, during the user's next round of competition in the fantasy sports contest, a reserve athlete is scheduled to compete in a real-life contest at home against team A, and the starting athlete is scheduled to compete in an away game against team B. The fantasy sports contest application may compare the starting athlete's performance score in away games against team B against the reserve athletes performance score in home games against team A. If an athlete is competing in multiple real-life contests during the user's next round of competition in the fantasy sports contest, or if performance criteria are used in parallel (e.g., resulting in more than one performance score for each athlete), performance scores may averaged, or the real-life statistics may be averaged to produce an average performance score for use in comparisons.

If the fantasy sports contest application uses performance criteria in series, then only one performance score is generated for each athlete. For example, the "Home vs. Away" and the "Next Opponent" performance criteria may be used in series to target an athlete's statistics from home games vs. team X. Alternatively, if the fantasy sports contest application uses the performance criteria in parallel, then multiple performance scores may be generated for each athlete. If one or more performance scores fall in favor of the reserve athlete, the fantasy sports contest application may generate a recommendation message to the user recommending a promotion for the reserve athlete. If multiple performance scores fall in favor of a reserve athlete, the fantasy sports contest application may generate a single recommendation message detailing the multiple reasons behind recommending an athlete's promotion to the starting lineup, or may generate multiple recommendation messages detailing each reason.

Figure 8:
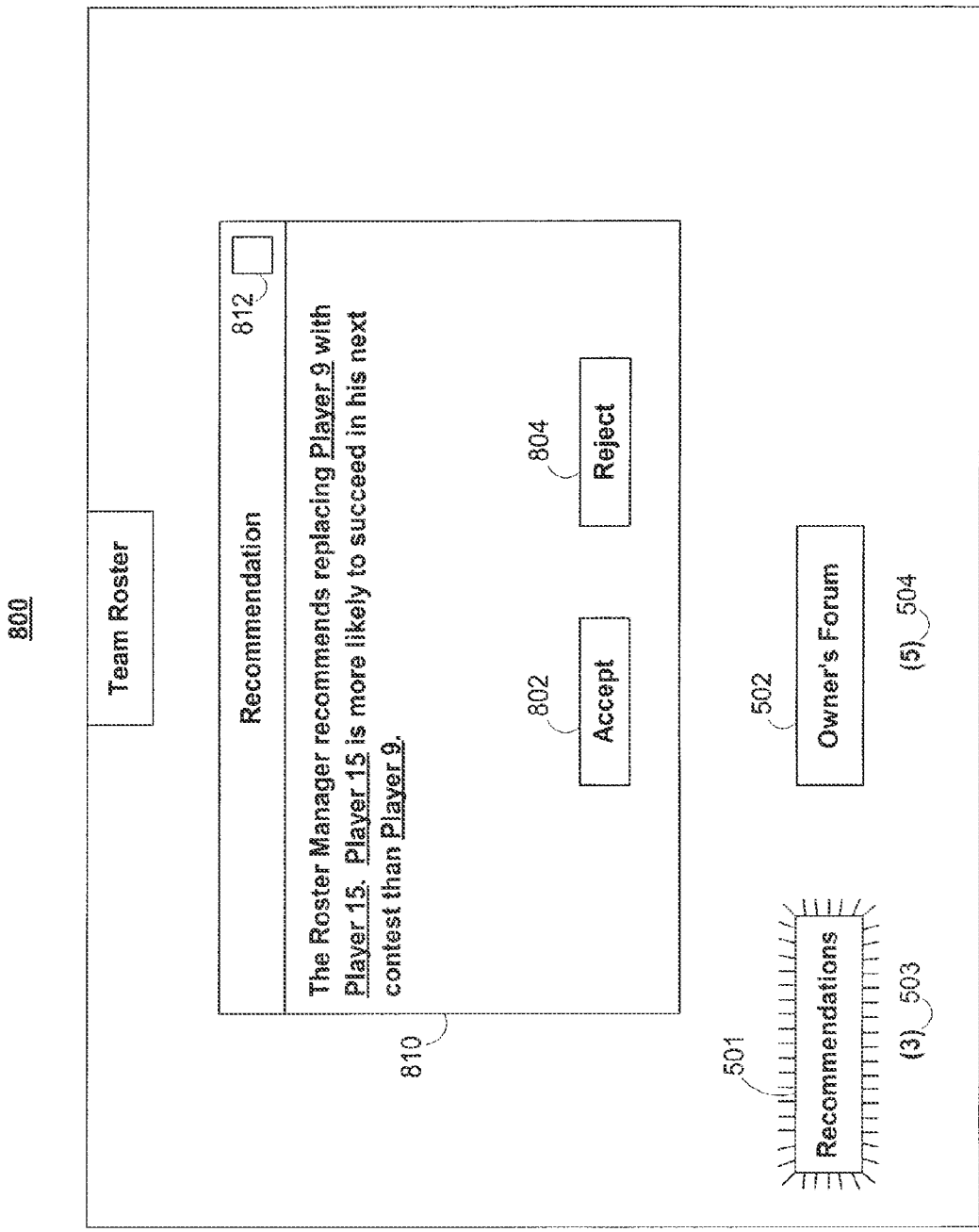
FIG. 8 shows an illustrative recommendation message displayed to the user for detailing a recommended roster change for a one game period in accordance with one embodiment of the present invention.

In an example illustrated by FIG. 8, the user is informed by element 503 that there are three recommendation messages awaiting review. By selecting recommendations link 501, the user is shown display 810 having a recommendation to change the user's starting lineup by replacing player 9 with player 15. The fantasy sports contest application gives the reason that player 15 is more likely to succeed in his next contest than player 9. The user is prompted by display 810 to either accept or reject the roster change detailed in the message using selectable elements 802 and 804, respectively. User selection of element 812 may enable the user to minimize display 810 to access the team roster screen. If the user chooses to accept the recommended roster change, the fantasy sports contest application may automatically rearrange the user's team roster to reflect the change. Once a decision has been reached on the first recommendation message, the next recommendation message may be displayed in display 810, and so on, until all recommendation messages have been shown to the user.

Figure 9:
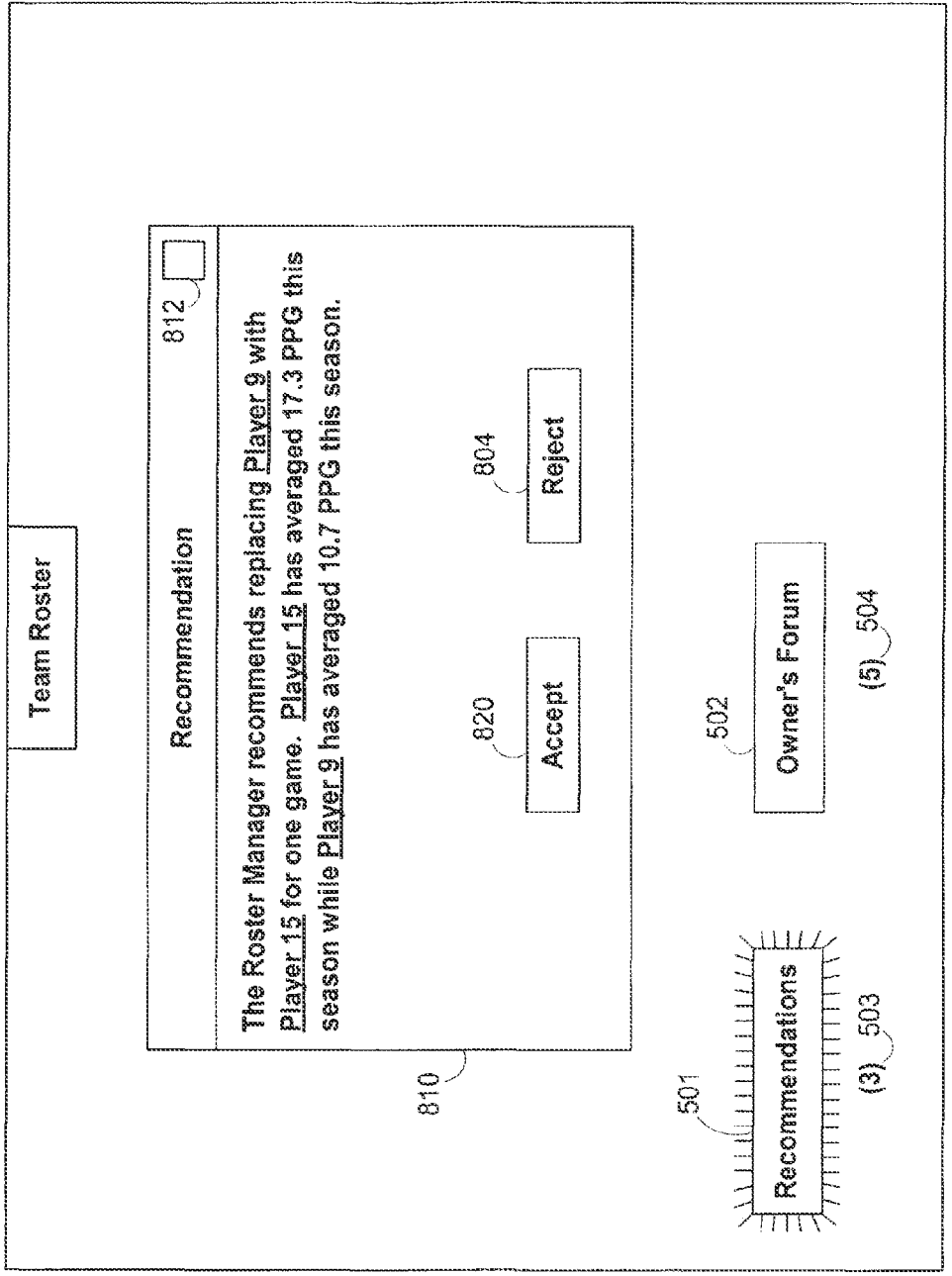
FIG. 9 shows an illustrative recommendation message displayed to the user detailing a recommended roster change in accordance with one embodiment of the present invention.

In one suitable approach, the fantasy sports contest application may generate both long-term and single-game specific recommendations for roster changes. In an example illustrated by FIG. 9, the performance criteria for season long performance has generated a performance score in favor of player 15 over player 9. Considering the long-term nature of the performance criteria used to generate the favorable performance score, the fantasy sports contest application may ignore any conflicting recommendations based on single-game performance criteria that may favor player 9 over player 15. For example, performance criteria targeting general past performance, such as performance for this season, or performance in the past ten contests, etc., may be considered long-term performance criteria. Performance criteria used to define a more specific situation that may be relevant to one contest, such as performance in home games, performance in games on grass, and performance versus a left-handed pitcher, etc., may be considered single-game performance criteria.

Alternatively, the user may be able to choose, using elements 720 in FIG. 7, whether to favor long-term performance criteria over single-game performance criteria, and vice versa. The fantasy sports contest application may inform the user whether a specific recommendation was based on long-term or single-game performance criteria. If the user chooses to favor either long-term or single-game performance criteria, then conflicting recommendations may be resolved according to the user's preference. Alternatively, if no preference is given, then the fantasy sports contest application may resolve conflicting recommendations by favoring either long-term or single-game performance criteria, or may generate conflicting recommendations for the user to resolve.

Figure 10:
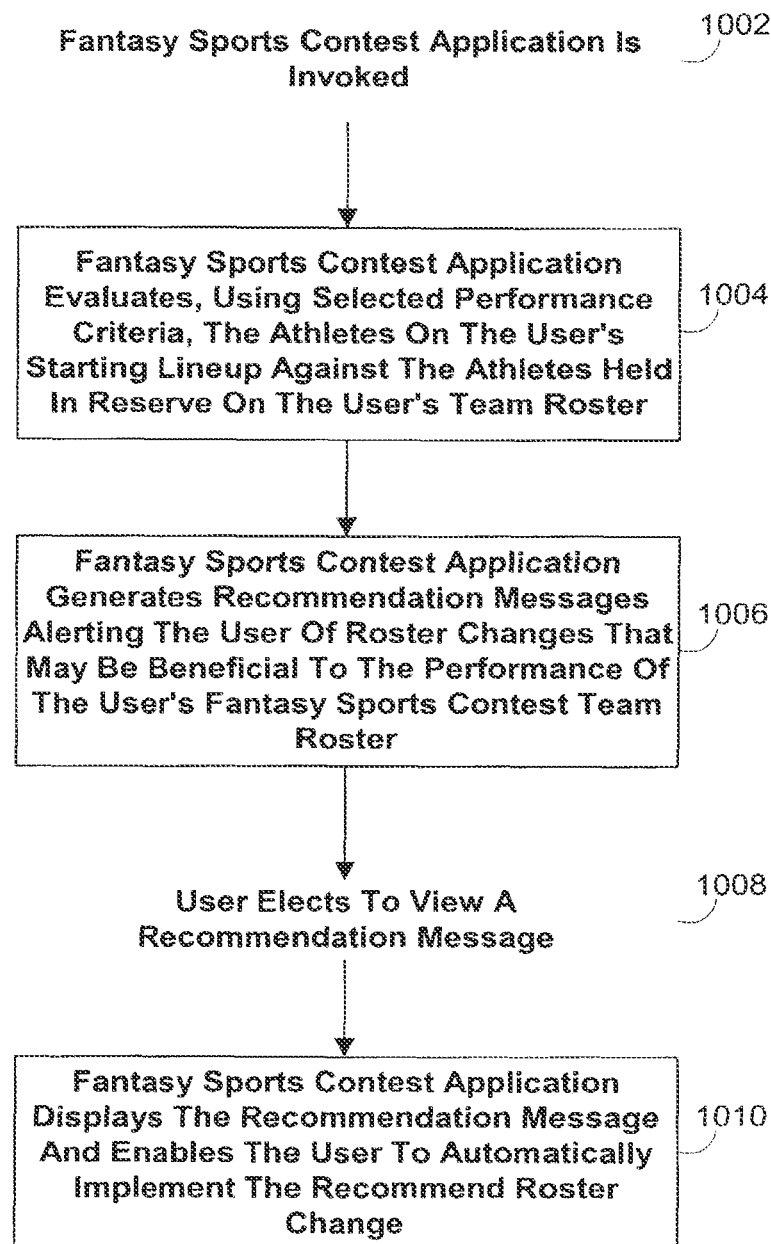
FIG. 10 is a flow chart of illustrative steps involved in providing the user with recommended roster changes in accordance with one embodiment of the present invention.

FIG. 10 is a flow chart of illustrative steps involved in providing the user with recommended roster changes. At step 1002 the fantasy sports contest application is invoked. At step 1004 the fantasy sports contest application evaluates, using selected performance criteria, the athletes on the user's starting lineup (i.e., athletes being used in the next round of the fantasy sports contest) against the athletes held in reserve on the user's team roster. At step 1006, the fantasy sports contest application generates recommendation messages alerting the user of roster changes that may be beneficial to the performance of the user's fantasy sports contest team roster. At step 1008, the user elects to view a recommendation message, and at step 1010, the fantasy sports contest application displays the recommendation message and enables the user to automatically implement the recommended roster change.

In another suitable approach, the fantasy sports contest application identifies and recommends to the user roster transactions with other fantasy sports contest team rosters that may be beneficial for the user's fantasy sports contest team. In one suitable approach, the performance criteria used to evaluate athletes for possible roster transactions may be restricted to long-term performance criteria, as opposed to single-game performance criteria. However, the user may desire situational performance in some cases, such as strategically managing for one key round in the fantasy sports contest, and the choice of criteria may be left to the user.

Figure 11:
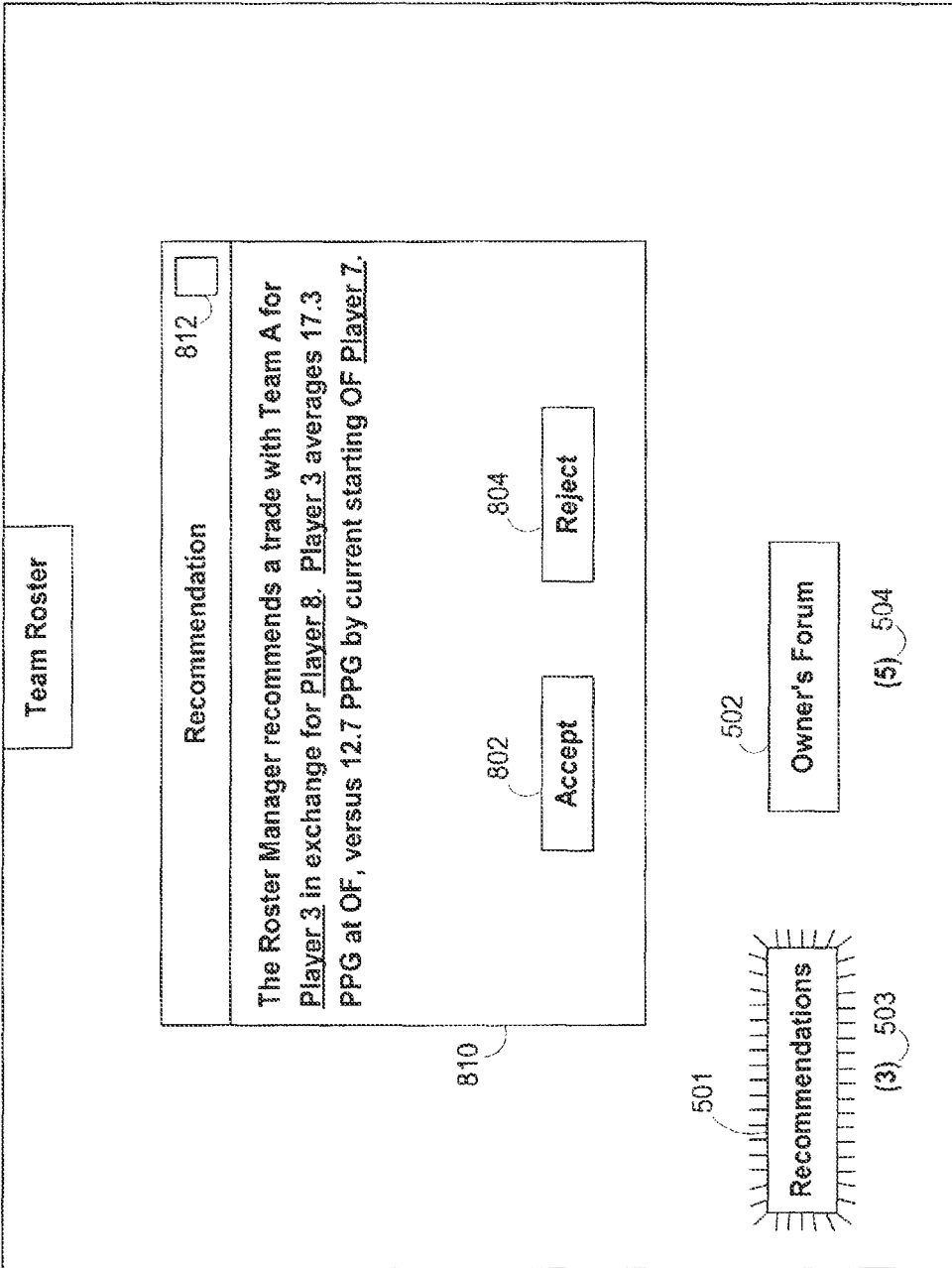
FIG. 11 shows an illustrative recommendation message displayed to the user for detailing a recommended roster transaction in accordance with one embodiment of the present invention.

In one suitable approach, the fantasy sports contest application may evaluate all team rosters in a competitive field to find mutually beneficial roster transactions. A mutually beneficial roster transaction may take the form of a roster transaction where the starting athlete at a certain position on one team is outperformed by the reserve athlete at that same position on another team, and vice versa. A trade between these teams of outperforming reserve athletes at different positions would result in upgraded performance for both teams' starting lineups. As illustrated by FIG. 11, a recommendation message detailing a recommended roster transaction may be sent to both users involved for approval. If mutual approval is granted, then the fantasy sports contest application may automatically implement the roster transaction.

Figure 12:
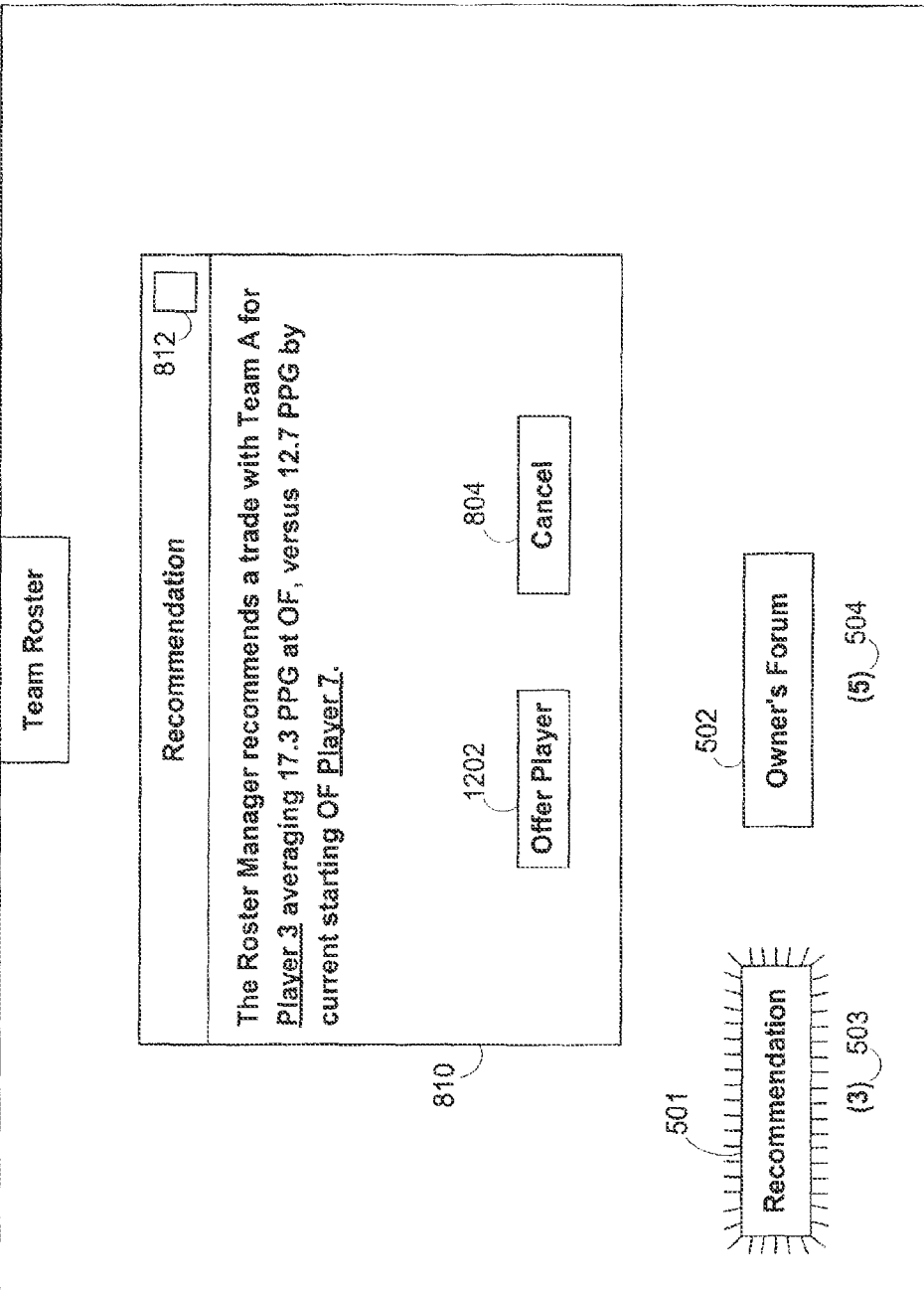
FIG. 12 shows an illustrative recommendation message displayed to the user showing a recommended athlete in accordance with one embodiment of the present invention.

In one suitable approach, the fantasy sports contest application may note the poorest performing athletic positions in the user's team roster, and evaluate all other team rosters for athletes at those positions who are outperforming the user's starting athletes. As illustrated by FIG. 12, the fantasy sports contest application may then recommend a trade for an outperforming athlete and query the user for athletes to offer in return using element 1202. Alternatively, in fantasy sports contests that do not use athletic positions as constraints, the fantasy sports contest application may simply target athletes that are outperforming the weakest performing athletes on the user's starting lineup.

FIG. 13 shows an illustrative offer screen 1300 that may be displayed following user selection of element 1202 in FIG. 12. The fantasy sports contest application may generate a list of recommended athletes to offer in trade by noting the weakest (e.g., lowest scoring) athletic positions on the opposing team's roster, and placing the user's athletes at those positions in display box 1310. Alternatively, the fantasy sports contest application may generate a list of recommended athletes by noting a particular performance score of the athlete being requested, and placing athletes with similar performance scores on the list. The user may respond to the recommendation message with a trade offer by selecting one or more players displayed in box 1310 or 1320 and selecting element 1304. The trade proposal may then be sent to the opposing user for approval. Upon approval, the fantasy sports contest application may automatically implement the roster transaction.

In another suitable approach, the fantasy sports contest application may use performance criteria to evaluate a pool of freely available athletes against athletes on the user's roster. The fantasy sports contest application may recommend adding an athlete to the roster, or exchanging an athlete for another already on the roster based on the results of comparisons using either long-term or single-game performance criteria.

In another suitable approach, the fantasy sports contest application may recommend multiparty roster transactions that involve three or more fantasy sports contest teams. A multiparty roster transaction may involve trading an athlete on the user's fantasy sports contest team roster for athletes from a second fantasy sports team, some of whom are in turn traded for athletes from a third fantasy sports contest team roster.

Figure 14:
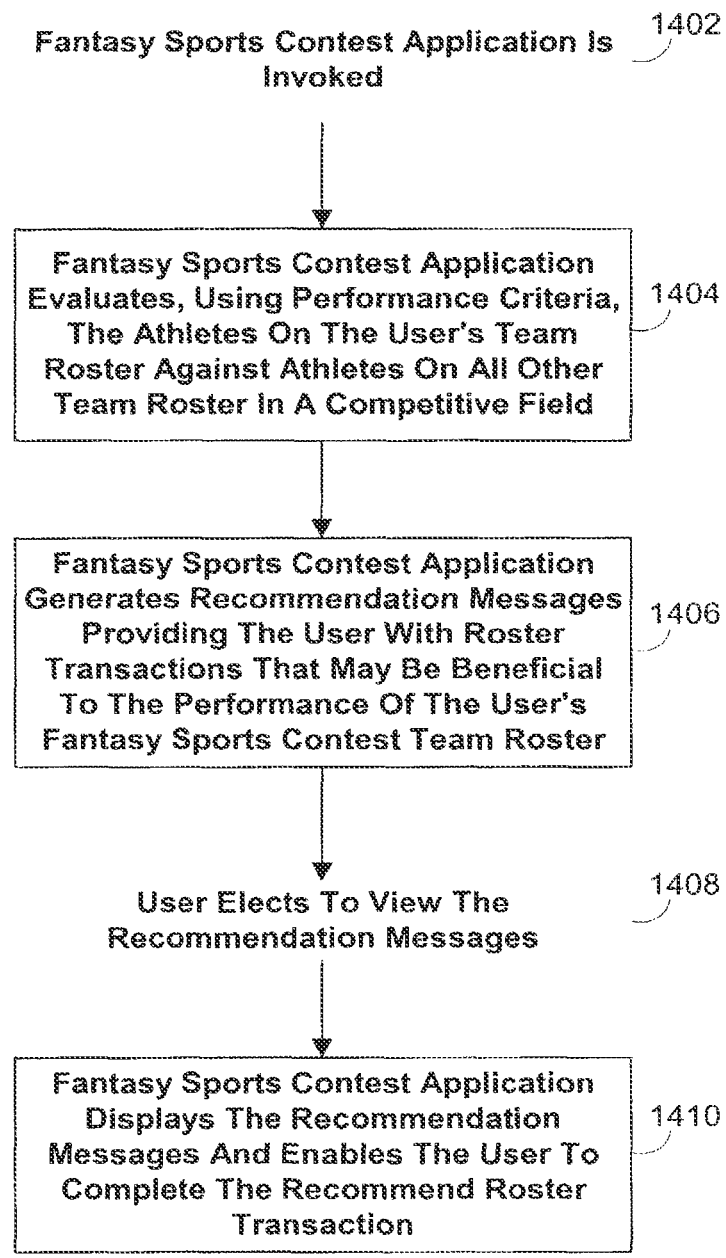
FIG. 14 is a flow chart of illustrative steps involved in providing the user with recommended roster transactions in accordance with one embodiment of the present invention.

FIG. 14 is a flow chart of illustrative steps for providing recommended roster transactions to the user. At step 1402, the fantasy sports contest application is invoked. At step 1404, the fantasy sports contest application evaluates, using performance criteria, the athletes on the user's team roster against athletes on all other team roster in a competitive field. At step 1406, the fantasy sports contest application generates recommendation messages providing the user with roster transactions that may be beneficial to the performance of the user's fantasy sports contest team roster. At step 1408, the user elects to view the recommendation messages, and at step 1410, the fantasy sports contest application displays the recommendation messages and enables the user to complete the recommended roster transaction.

Figure 15:
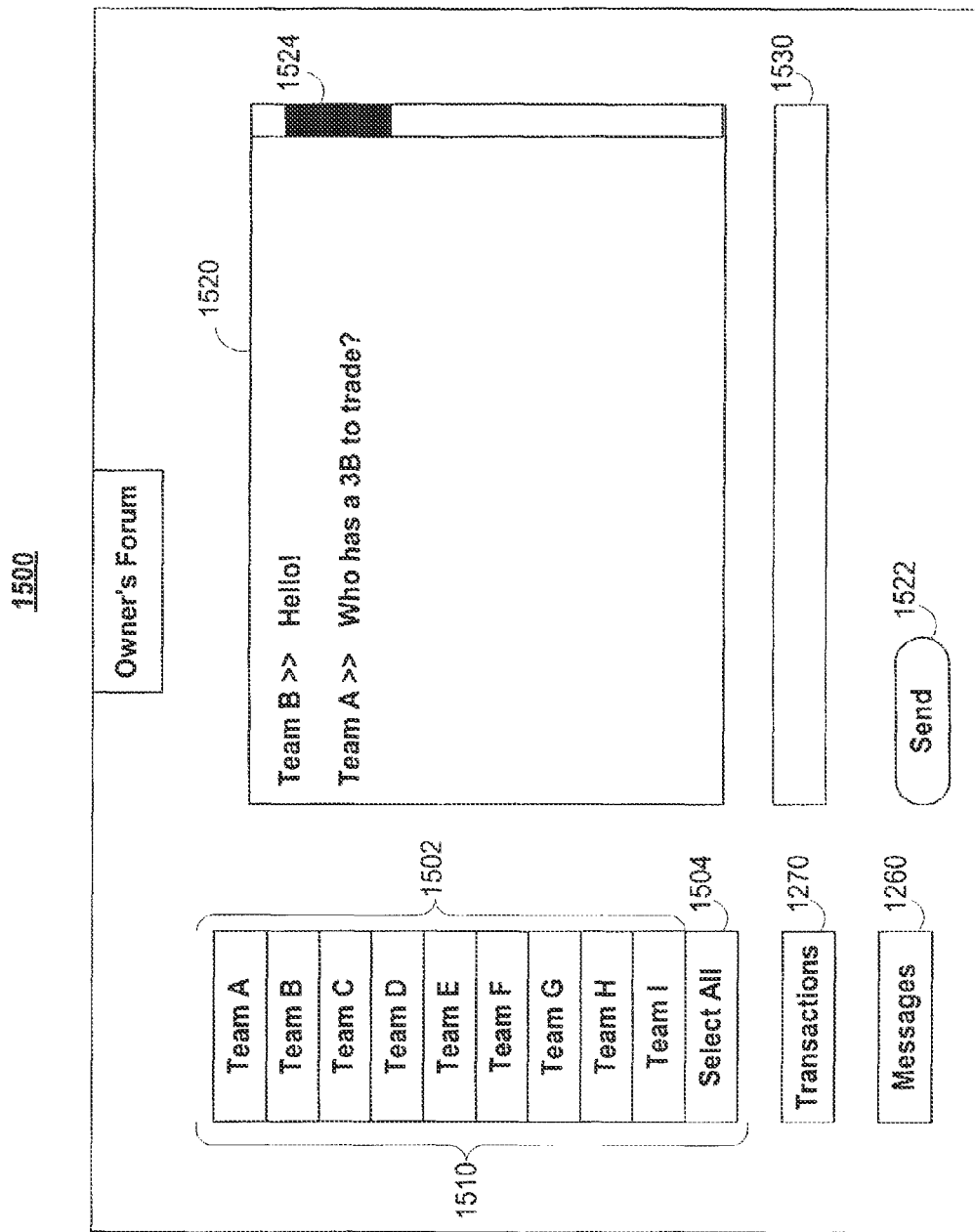
FIG. 15 shows an illustrative display screen for an instant messaging feature having roster management capabilities in accordance with one embodiment of the present invention.

In one embodiment, the fantasy sports contest application of the present invention provides the user with an instant messaging feature having roster management capabilities. An illustrative display 1500 of an Owner's Forum is shown in FIG. 15. Display 1500 includes display box 1510 having selectable elements 1502 and 1504. Element 1502 is displayed for each user instantly present in the forum, and element 1504 may be used to select all elements 1502. As seen in FIG. 15, shading of elements 1502 may be used to indicate user selection. Dialogue box 1520 is provided, along with message entry box 1530 and message send element 1522 to enable the user to view and send instant messages. Tool bar 1524 may be provided in dialogue box 1520 for scrolling through past messages in the user's messaging session. Dialogue box 1520 may display all messages sent by users in the forum, or may display only messages from users selected in box 1510. Similarly, messages being sent by the user using message entry box 1530 and send element 1522 may be sent to all users in the forum, or may be sent to only selected users.

Figure 16:
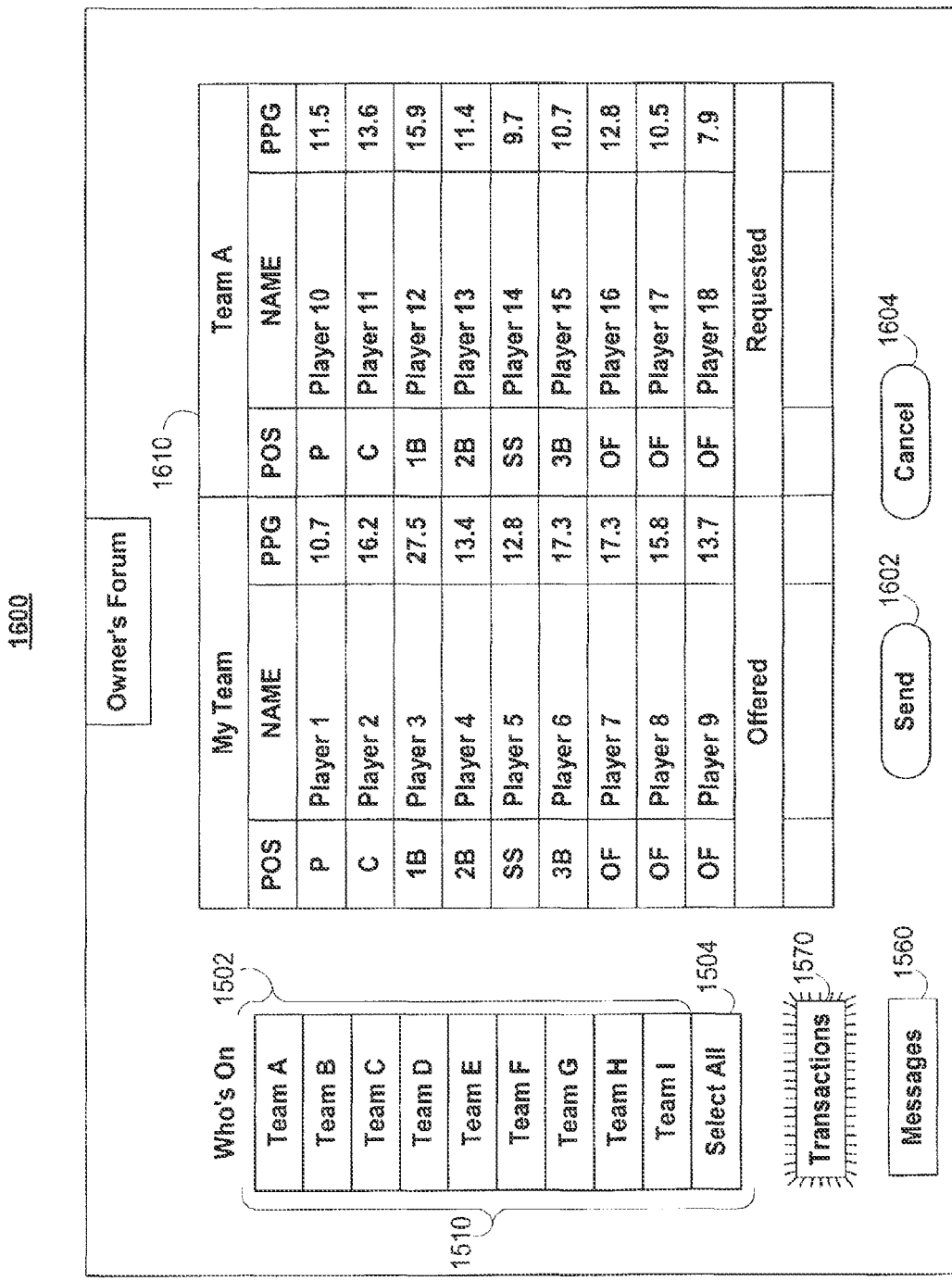
FIG. 16 shows an illustrative display screen having team roster information for an instant messaging feature having roster management capabilities in accordance with one embodiment of the present invention.

As illustrated by FIG. 16, user selection of "Transactions" element 1570 may cause the fantasy sports contest application to display screen 1600 that enables the user to construct trade queries and trade proposals. Screen 1600 may show the user's team roster and a roster of athletes on the fantasy sports contest teams represented by selected elements 1502. More than one fantasy sports contest team may be selected at the same time using elements 1502, and all fantasy sports contest teams may be selected using element 1504.

From roster display 1610, the user may construct a desired roster transaction. The fantasy sports contest application may send the user constructed trade proposal detailing the desired roster transaction to the appropriate user upon user selection of element 1602. The user may send trade queries after filling in only an offered athlete or only an requested athlete. A query for a requested athlete is sent to the appropriate team having that athlete on its team roster, whereas a query for an offered athlete may be sent to all teams in the fantasy sports league, or only those teams selected in box 1510.

Figure 17:
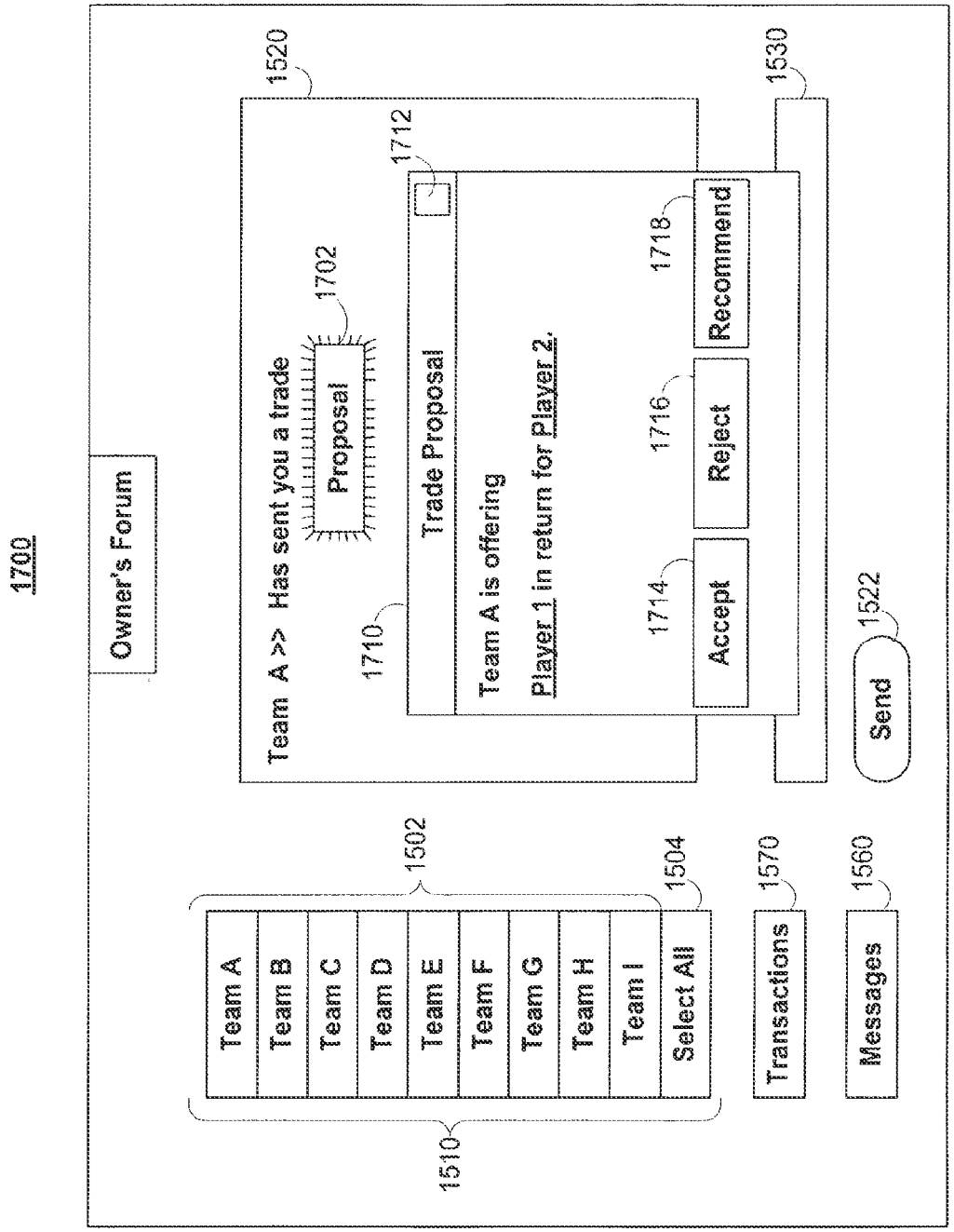
FIG. 17 shows an illustrative display screen of an instant messaging feature having roster management capabilities displaying a proposed roster transaction in accordance with one embodiment of the present invention.

As illustrated by FIG. 17, the trade proposal or trade query may be displayed in dialogue box 1520 using selectable element 1702, the selection of which may spawn display box 1710 detailing the trade proposal or trade query. Display box 1710 may include selectable elements 1714 and 1716 that enable the user to accept or reject the trade proposal, respectively. If a trade proposal is approved by the user, the fantasy sports contest application may automatically update both rosters to reflect the transaction. In one suitable approach the fantasy sports contest application may provide the user with a recommendation concerning the trade proposal displayed in box 1710. For example, upon user selection of selectable element 1718, the fantasy sports contest application may display a transaction recommendation screen.

In other suitable arrangements not depicted in the FIGS., the fantasy sports contest application may enable the user to withdraw an offer before the offer has been accepted by the other user (e.g., the user has changed his or her mind), or to counteroffer a trade proposal received from another team (e.g., edit the offer received from another team).

In one suitable approach, the fantasy sports contest application may evaluate the user's offered athlete against the received athlete using a performance score generated using a single performance criteria, using a performance score generated using multiple performance criteria in series, using an averaged performance score generated using multiple performance criteria in parallel, or any suitable combination thereof. The selection of performance criteria to be used may be left to the user (e.g., using selection screen 700 of FIG. 7) or may be chosen by the fantasy sports contest application.

Figure 18:
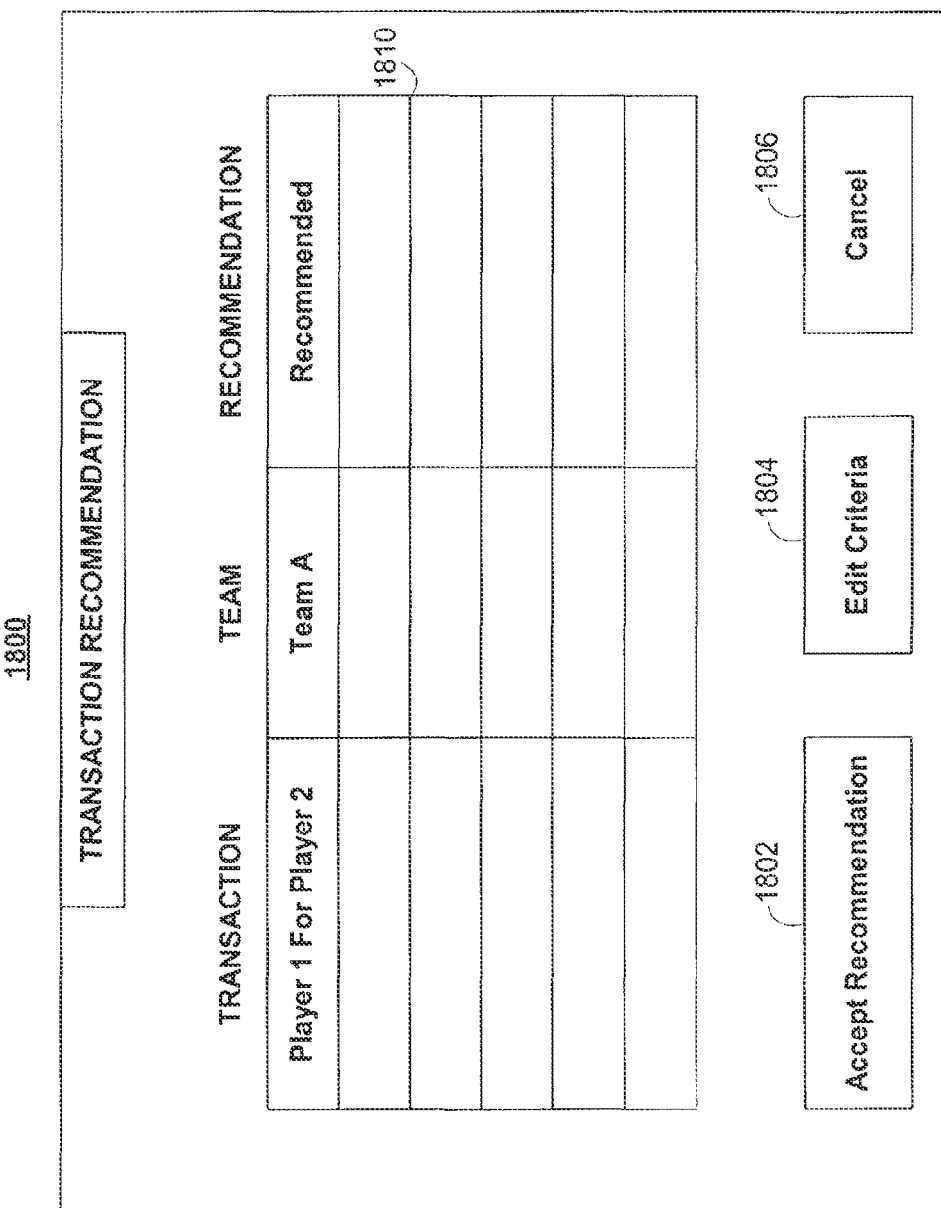
FIG. 18 shows an illustrative display screen for providing the user with a recommendation concerning a proposed roster transaction in accordance with one embodiment of the present invention.

In one suitable approach, the fantasy sports contest application may compare athletes offered in trade that play at different athletic positions. In this case, the fantasy sports contest application may consider the performance score total of a team starting lineup resulting from a proposed trade against the performance score total of the original team starting lineup. A trade may be recommended if the performance score total of the team starting lineup is improved by the trade. Conversely, the fantasy sports contest application may not recommend a trade if the performance score total of the team starting lineup is not improved by the trade. As illustrated in FIG. 18, the fantasy sports contest application may display a transaction recommendation in box 1810. User selection of element 1802 causes the fantasy sports contest application to implement the recommendation in box 1810. For example, if the trade in box 1810 is recommended by the fantasy sports contest application, user selection of element 1802 causes the trade to be implemented. User selection of element 1804 may cause the fantasy sports contest application to display a screen substantially equivalent to that of FIG. 7, where the user may be able to edit the performance criteria used by the fantasy sports contest application to generate recommendations on roster transactions.

Figure 19:
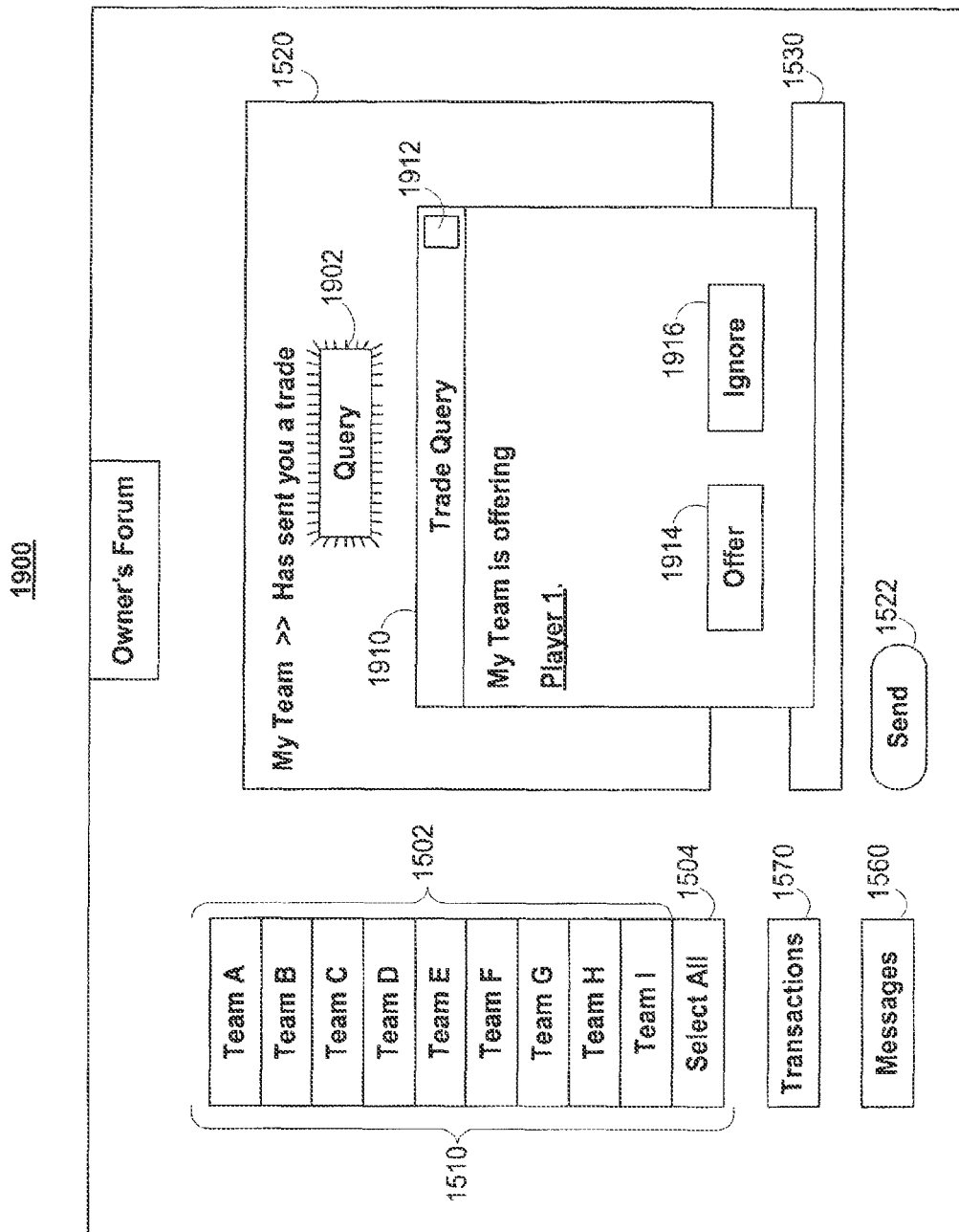
FIG. 19 shows an illustrative display screen for an instant messaging feature with roster management capabilities displaying a roster transaction query in accordance with one embodiment of the present invention.

As illustrated by FIG. 19, the fantasy sports contest application may enable the user may respond to a trade query by either selecting element 1916 to ignore the trade query, or by selecting element 1914 to respond to the trade query. If the user ignores the received trade query, the fantasy sports contest application may inform the user that initiated the trade query using an instant message. If the user responds to the query by offering athletes in return (e.g., by selecting element 1914 and using an ensuing display substantially equivalent to the one shown in FIG. 13), the fantasy sports contest application may return the trade query as a trade proposal to the initiating user via an instant message.

In another suitable approach, the instant messaging forum enables the user to propose and complete roster transactions with other users in a fantasy sports contest league regardless of the user's instant presence in the forum. This may be accomplished by providing a message box that stores the all trade proposals and trade queries sent and received by the user. The message box may also track the status of all trade proposals and trade queries sent and received by the user (e.g., whether a trade proposal has been accepted, ignored, etc.).

Figure 20:
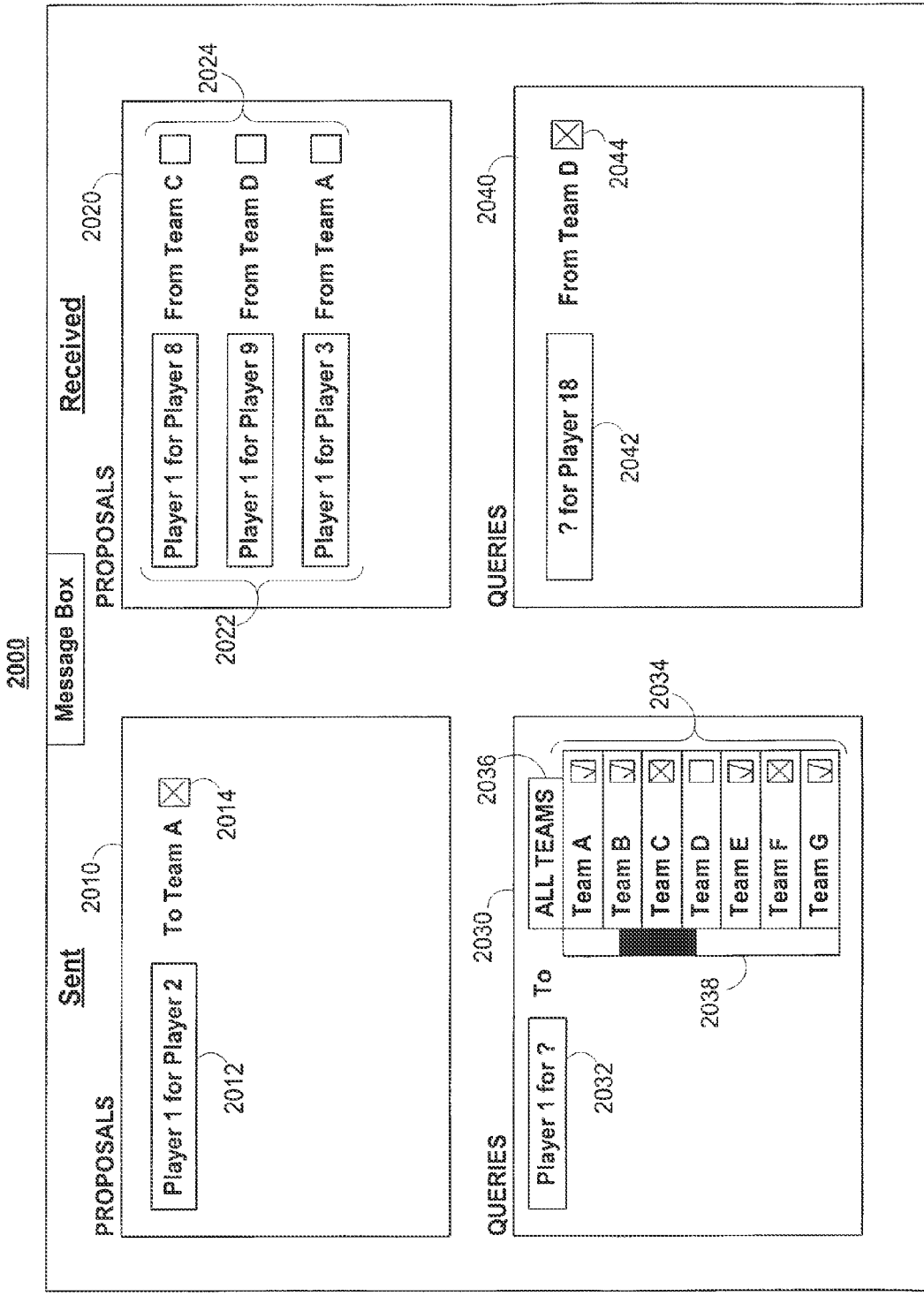
FIG. 20 shows an illustrative display screen for a message box feature that records all of the user's sent and received trade proposals and trade queries in accordance with one embodiment of the present invention.

As illustrated in FIG. 15, "Messages" element 1560 may be provided that serves as a link to a message box. As shown in FIG. 20, the fantasy sports contest application may display message box 2000 upon user selection of element 1560. Within message box 2000, trade proposals sent by the user may be recorded in region 2010, and trade proposals received by the user may be recorded in region 2020. Boxes 2014 and 2024 may be used to indicate the status of sent and received trade proposals, respectively. Where a checkmark may indicate an accepted proposal, an X may indicate a rejected proposal, and a blank box may indicate a proposal that has not been reviewed. Similarly, trade queries sent and received by the user may be recorded in regions 2030 and 2040, respectively. Boxes 2034 and 2044 may be used to indicate the status of sent and received trade queries, where a checkmark may indicate a query that has been returned as a trade proposal, an X may indicate a query that has been ignored, and a blank box may indicate a query that has not been reviewed. Selectable element 2036 may be used to hold status information for a query sent to a large number of teams, and may spawn display box 2038 when selected by the user. Display box 2038 may include elements 2034 that indicate the status of a trade query with regard to an individual fantasy sports contest team.

Figure 21:
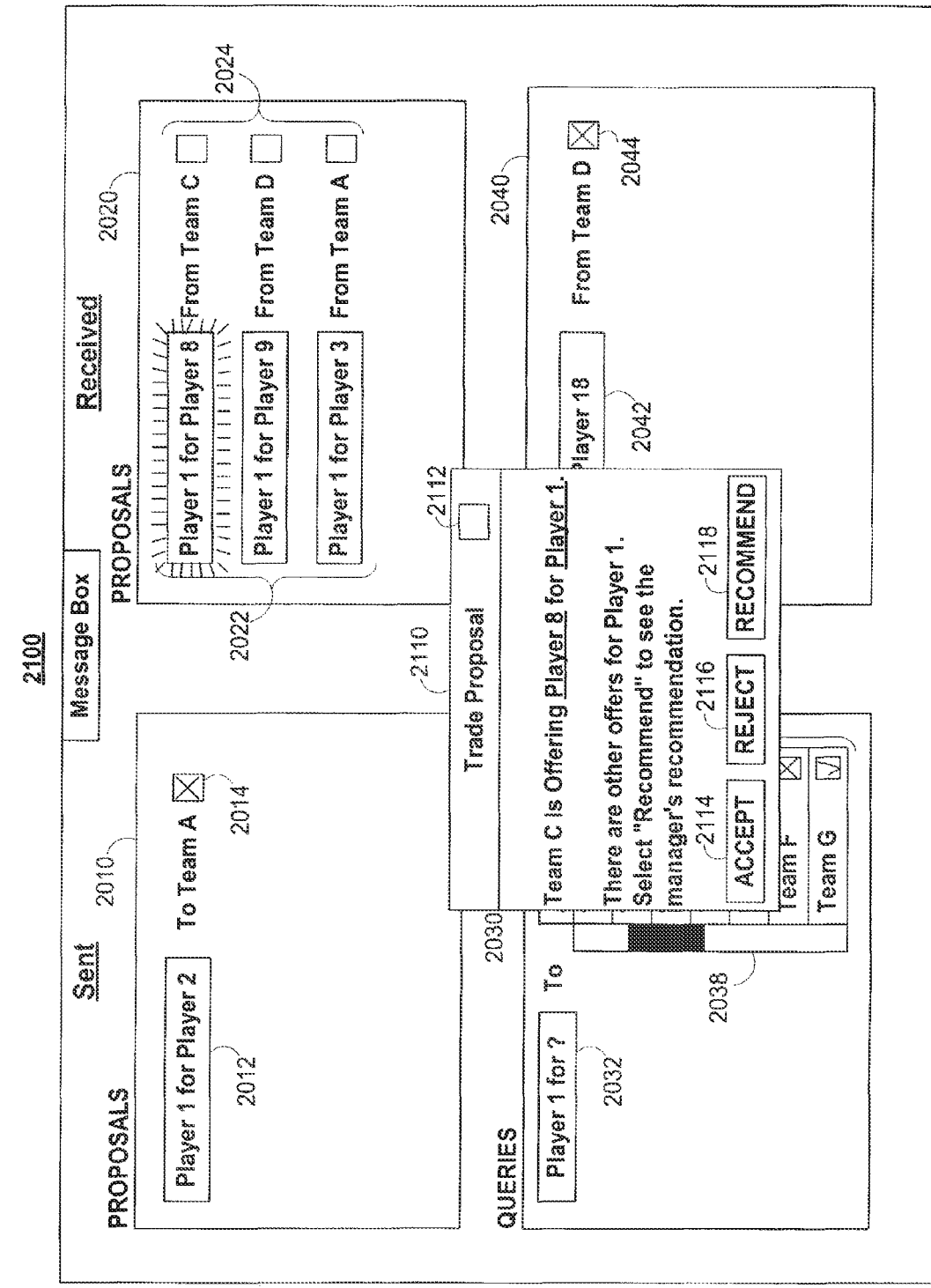
FIG. 21 shows an illustrative display screen for a message box feature that records all of the user's sent and received trade proposals and trade queries displaying a proposed roster transaction in accordance with one embodiment of the present invention.

As illustrated by FIG. 21, trade proposals and trade queries may be stored in the form of selectable elements 2012/2022/2032/2042. Upon user selection of a selectable element, the fantasy sports contest application may display message box 2110 detailing the trade proposal or trade query and enabling the user to perform one or more actions with respect to the trade proposal or trade query. A previously resolved trade proposal or trade query may be displayed without an accompanying selectable element. The history of proposals and queries kept in the message box may be limited by a set number, or may be limited by a set time period.

In one suitable approach, the fantasy sports contest application may detect the existence of multiple received trade proposals in box 2020 for the same athlete on the user's team roster. In this case, the fantasy sports contest application may inform the user of the existence of multiple trade offers for that same athlete. The fantasy sports contest application may also offer the user a recommendation on the multiple trade proposals. As shown in FIG. 21, user selection of element 2022 representing one of the multiple trade offers causes the fantasy sports contest application to display message box 2110 informing the user of other trade offers for the same athlete. Message box 2110 may also include selectable element 2118 in that provides the user with a link to a recommendation on the multiple trade offers.

As illustrated in FIG. 22, user selection of element 2118 may cause the fantasy sports contest application to display screen 2200 with a recommendation on multiple trade proposals. The fantasy sports contest application may evaluate each of the offered athletes using a performance score generated using a single performance criteria, using a performance score generated using multiple performance criteria in series, using an averaged performance score generated using multiple performance criteria in parallel, or any suitable combination thereof. The selection of performance criteria to be used may be left to the user (e.g., using selection screen 700 of FIG. 7) or may be chosen by the fantasy sports contest application.

In one suitable approach, the fantasy sports contest application may accommodate a situation where athletes offered in trade play at different athletic positions. In such a case, the fantasy sports contest application may consider the performance score total of the team starting lineup resulting from each trade proposal against the performance score total of the original team starting lineup. A trade may be recommended if the performance score total of the team starting lineup is improved by the trade. Conversely, the fantasy sports contest application may not recommend a trade if the performance score total of the team starting lineup is not improved by the trade.

Figure 23:
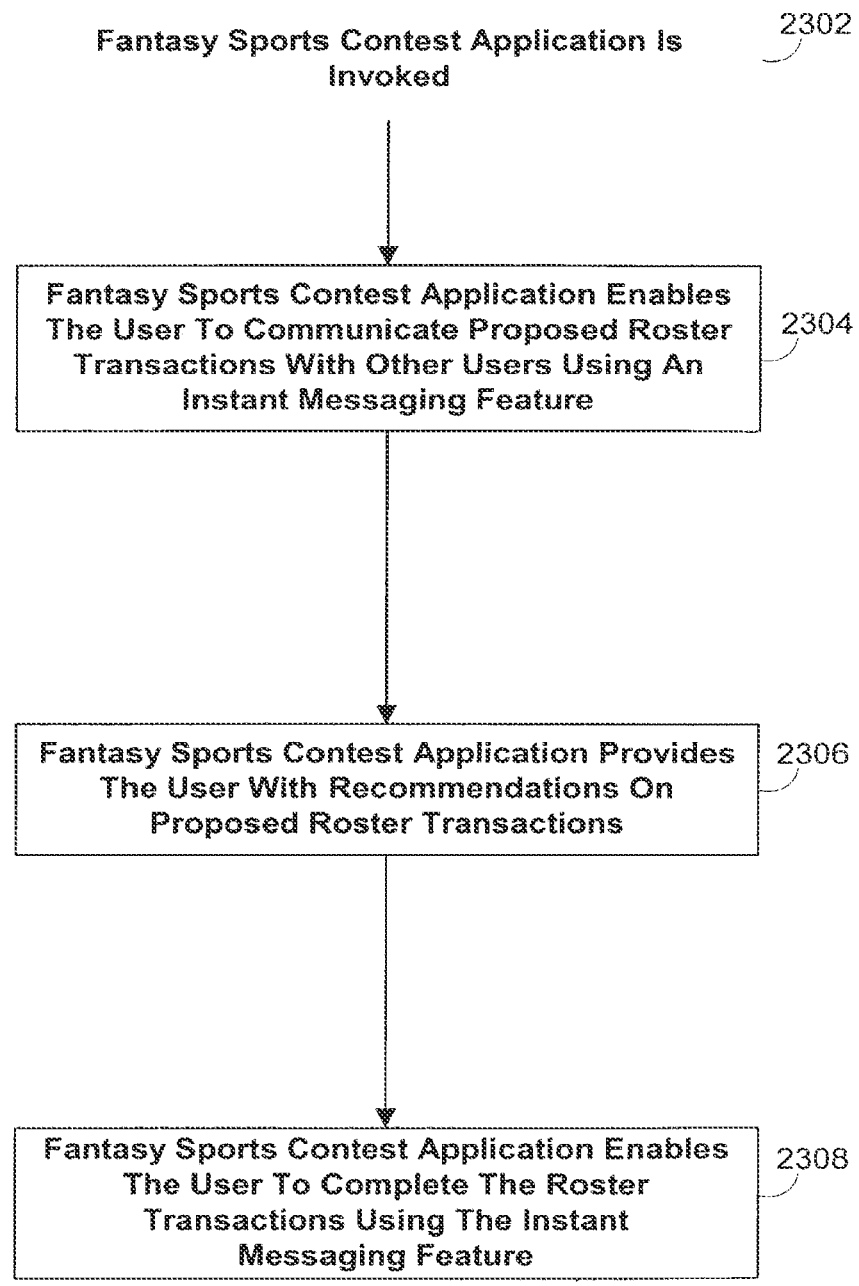
FIG. 23 is a flow chart of illustrative steps involved in providing the user with recommendations on the benefit of proposed roster transactions in accordance with one embodiment of the present invention.

Using the performance score totals of the starting lineups resulting from multiple trade proposals, the fantasy sports contest application may also rank multiple trade proposals. As illustrated by FIG. 23, the fantasy sports contest application has evaluated three trade offers for player 1, and provided recommended/not recommended advice concerning each transaction, as well as a rank for each recommended transaction.

In another suitable approach, one or more athletes to be offered from the user's fantasy sports contest team roster in each of the trade proposals may be a different athlete or a different combination of athletes. The fantasy sports contest application may employ a process substantially equivalent to the process described above for providing the user with recommendations on each trade proposal. For example, a trade proposal that improves a total performance score of the user's team roster may be recommended, and vice versa. The fantasy sports contest application may also rank the trade proposals using the differential between the total performance score of the user's team roster from before and after the proposed roster transaction. For example, the fantasy sports contest application may rank a trade proposal that benefits the user's team roster by the most number of performance score points first.

FIG. 23 is a flow chart of illustrative steps for providing the user with an instant messaging featuring having roster management capabilities within the fantasy sports contest application. At step 2302 the fantasy sports contest application is invoked. At step 2304, the fantasy sports contest application enables the user to communicate proposed roster transactions with other users using an instant messaging forum. At step 2306, the fantasy sports contest application provides the user with recommendations on proposed roster transactions. At step 2308, the fantasy sports contest application enables the user to complete roster transactions using the instant messaging forum.

The fantasy sports contest application of the present invention is not limited to use with traditional fantasy sports contests, which are usually season-long contests between fantasy sports contest teams organized in a fantasy sports contest league. The fantasy sports contest application of the present invention may be used in fantasy sports contests that involve choosing and managing picks in a single real-life sports contest, or other fantasy-style contests that involve choosing and managing a roster of picks over any duration of time in a real-life sports contest.

Figure 24:
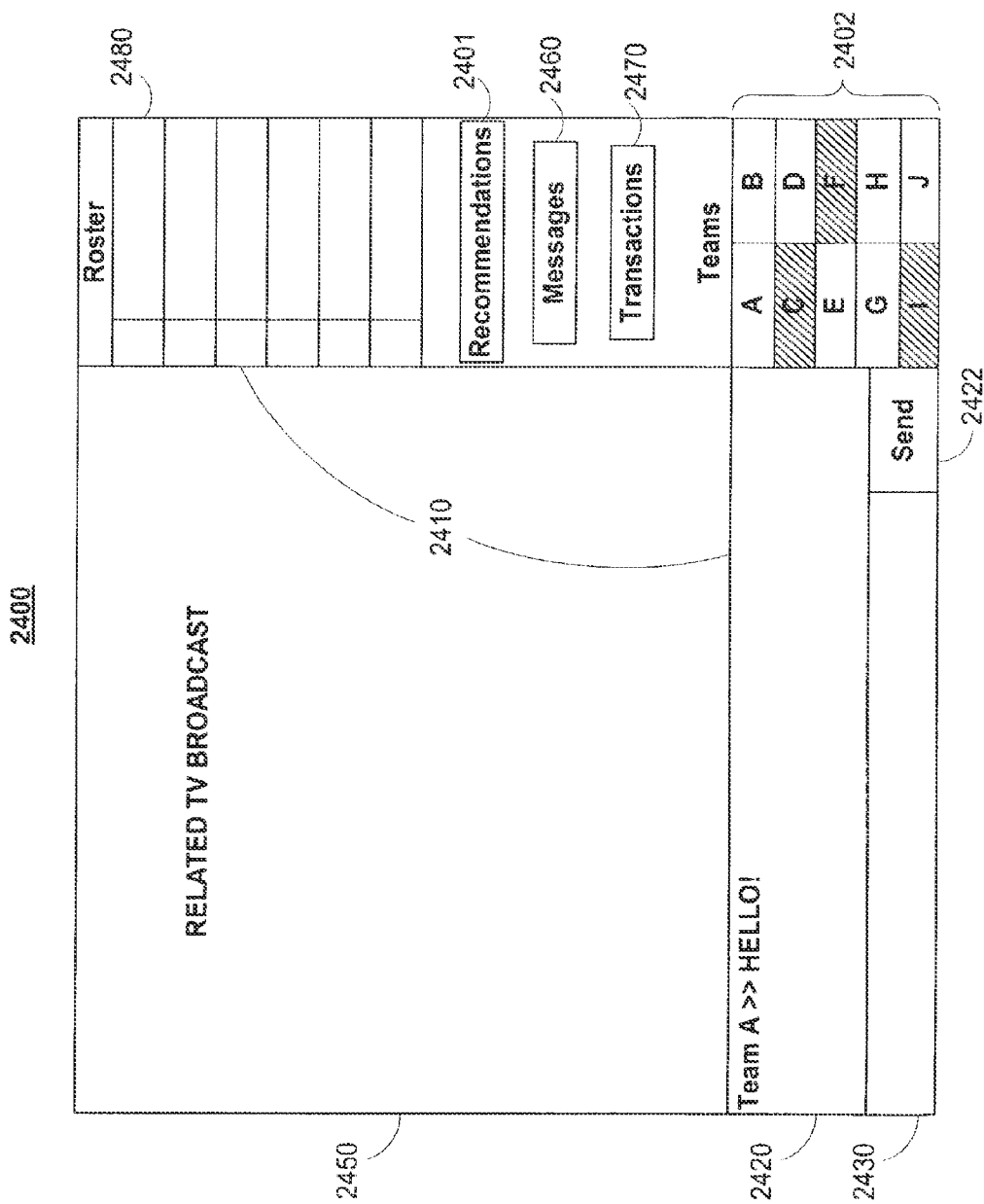
FIG. 24 shows an illustrative display screen of a fantasy sports contest application for a fantasy sports contest based on a television sports broadcast in accordance with one embodiment of the present invention.

FIG. 24 shows an illustrative embodiment of the present invention, where the functionality of the fantasy sports contest application may be provided simultaneously with a television broadcast related to the fantasy sports contest. As shown in FIG. 24, fantasy sports contest application display 2410 may be displayed along with reduced size television broadcast of a sports contest 2450. Fantasy sports contest application display 2410 may be displayed in other ways, such as using an overlay, a separate display window, and any other suitable display method. All features of the present fantasy sports contest application may be provided using display 2410. As shown in FIG. 24, the instant messaging feature may be provided using elements 2420, 2430, and 2422. The user may select other users present in the forum using elements 2402. Recommendations may be accessed using element 2402, the message box using element 2460, and the roster transaction screen using element 2470. Fantasy sports contest information may be displayed using display region 2480. Alternatively, these features may be abridged or otherwise modified to accommodate a fantasy sports contest based, at least in part, on the performance of athletes competing in a game that is being televised (e.g., television broadcast 2450).

Thus, systems and methods for providing a fantasy sports contest application with improved roster management capabilities are provided. One skilled in the art will appreciate that the present invention can be practiced by other than the described embodiments, which are presented for purposes of illustration and not of limitation, and the present invention is limited only by the claims which follow.

What is claimed is:

1. A method for using a fantasy sports contest application to manage a fantasy sports team roster, the method comprising:

receiving, at a first time via input circuitry of a user device, a user input to create a fantasy sports team roster associated with a fantasy sports contest, wherein the fantasy sports team roster comprises a first real-life sports player, and wherein the user device is associated with a profile of a user;

accessing, at a second time, a real-life sports team roster associated with the first real-life sports player from a database of real-life sports team rosters located on a server remote to the user device;

determining, based on the real-life sports team roster, availability of the first real-life sports player with respect to a round of the fantasy sports contest; and in response to determining that the first real-life sports player is unavailable with respect to the round:

identifying a second real-life sports player that is available with respect to the round;

retrieving data identifying a first role of the first real-life sports player and a second role of the second real-life sports player;

determining that the second real-life sports player is a replacement for the first real-life sports player when the first role matches the second role;

receiving, at the user device, an alert comprising first data about the unavailability of the first real-life sports player and second data identifying the second real-life sports player as a replacement for the first real-life sports player; and based on the alert, generating for display, at the user device, a selectable element related to replacing the first real-life sports player with the second real-life sports player.

2. The method of claim 1, wherein determining that the second real-life sports player is a replacement for the first real-life sports player further comprises:

identifying a third real-life sports player that is available with respect to the round;

computing a first performance score of the second real-life sports player and a second performance score of the third real-life sports player, wherein the first performance score and the second performance score are proportional to athletic performance of the second real-life sports player and the third real-life sports player, respectively, with respect to the fantasy sports contest; and selecting the second real-life sports player in response to determining that the first performance score exceeds the second performance score.

3. The method of claim 2, wherein the first performance score is computed based on converting real-life sports statistics for the second real-life sports player to a first score in the fantasy sports contest in accordance with rules of the fantasy sports contest, and wherein the second performance score is computed based on converting real-life sports statistics for the third real-life sports player to a second score in the in the fantasy sports contest in accordance with rules of the fantasy sports contest.

4. The method of claim 1, further comprising:

determining a start time corresponding to the beginning of the round;

determining, within a threshold amount of time before the start time of the round, that the first real-life sports player is unavailable with respect to the round and that the first real-life sports player in a starting lineup of the fantasy sports roster; and in response to determining that that the first real-life sports player is unavailable with respect to the round and is in a starting lineup of the fantasy sports roster, replacing the first real-life sports player with the second real-life sports player.

5. The method of claim 1, further comprising:

receiving a user selection of the selectable element via the input circuitry of the user device; and in response to receiving the user selection, replacing the first real-life sports player with the second real-life sports player in the fantasy sports team roster.

6. The method of claim 1, wherein the user device is a first user device, further comprising:

identifying, based on the profile of the user, a second user device; and transmitting the alert to the second user device.

7. The method of claim 1, wherein the second real-life sports player is on a reserve lineup of the fantasy sports team roster, and wherein the first real-life sports player is on a starting lineup of the fantasy sports team roster, further comprising:

replacing the first real-life sports player with the second real-life sports player by placing the second real-life sports player on the starting lineup of the fantasy sports team roster and placing the first real-life sports player on the reserve lineup of the fantasy sports team roster.

8. The method of claim 1, further comprising:

generating for display a plurality of real-life sports players associated with the fantasy sports team roster; and visually distinguishing the first real-life sports player with respect to the plurality of real-life sports players associated with the fantasy sports team roster in response to determining that the first real-life sports player is unavailable with respect to the round.

9. The method of claim 1, further comprising:

generating for display a plurality of real-life sports players associated with the fantasy sports team roster; and visually distinguishing the second real-life sports player with respect to the plurality of real-life sports players in response to determining that the second real-life sports player is a replacement for the first real-life sports player.

10. A system for using a fantasy sports contest application to manage a fantasy sports team roster, the system comprising control circuitry configured to:

receive, at a first time via input circuitry of a user device, a user input to create a fantasy sports team roster associated with a fantasy sports contest, wherein the fantasy sports team roster comprises a first real-life sports player, and wherein the user device is associated with a profile of a user;

accessing, at a second time, a real-life sports team roster associated with the first real-life sports player from a database of real-life sports team rosters located on a server remote to the user device;

determine, based on the real-life sports team roster, availability of the first real-life sports player with respect to a round of the fantasy sports contest; and in response to determining that the first real-life sports player is unavailable with respect to the round:

identify a second real-life sports player that is available with respect to the round;

retrieve data identifying a first role of the first real-life sports player and a second role of the second real-life sports player;

determine that the second real-life sports player is a replacement for the first real-life sports player when the first role matches the second role;

receive, at the user device, an alert comprising first data about the unavailability of the first real-life sports player and second data identifying identifies the second real-life sports player as a replacement for the first real-life sports player; and based on the alert, generate for display, at the user device, a selectable element related to replacing the first real-life sports player with the second real-life sports player.

11. The system of claim 10, wherein the control circuitry is further configured, when determining that the second real-life sports player is a replacement for the first real-life sports player, to:
identify a third real-life sports player that is available with respect to the round;
compute a first performance score of the second real-life sports player and a second performance score of the third real-life sports player, wherein the first performance score and the second performance score are proportional to athletic performance of the second real-life sports player and the third real-life sports player, respectively, with respect to the fantasy sports contest; and
select the second real-life sports player in response to determining that the first performance score exceeds the second performance score.

12. The system of claim 11, wherein the first performance score is computed based on converting real-life sports statistics for the second real-life sports player to a first score in the fantasy sports contest in accordance with rules of the fantasy sports contest, and wherein the second performance score is computed based on converting real-life sports statistics for the third real-life sports player to a second score in the in the fantasy sports contest in accordance with rules of the fantasy sports contest.

13. The system of claim 10, wherein the control circuitry is further configured to:
determine a start time corresponding to the beginning of the round;
determine, within a threshold amount of time before the start time of the round, that the first real-life sports player is unavailable with respect to the round and that the first real-life sports player in a starting lineup of the fantasy sports roster; and
in response to determining that that the first real-life sports player is unavailable with respect to the round and is in a starting lineup of the fantasy sports roster, replace the first real-life sports player with the second real-life sports player.

14. The system of claim 10, wherein the control circuitry is further configured to:
receiving a user selection of the selectable element via the input circuitry of the user device; and
in response to receiving the user selection, replace the first real-life sports player with the second real-life sports player in the fantasy sports team roster.

15. The system of claim 10, wherein the user device is a first user device, and wherein the control circuitry is further configured to:
identify, based on the profile of the user, a second user device associated with the user; and
transmit the alert to the second user device.

16. The system of claim 10, wherein the second real-life sports player is on a reserve lineup of the fantasy sports team roster, and wherein the first real-life sports player is on a starting lineup of the fantasy sports team roster, and wherein the control circuitry is further configured to:
replace the first real-life sports player with the second real-life sports player by placing the second real-life sports player on the starting lineup of the fantasy sports team roster and placing the first real-life sports player on the reserve lineup of the fantasy sports team roster.

17. The system of claim 10, further comprising:
generate for display a plurality of real-life sports players associated with the fantasy sports team roster; and
visually distinguish the first real-life sports player with respect to the plurality of real-life sports players associated with the fantasy sports team roster in response to determining that the first real-life sports player is unavailable with respect to the round.

18. The system of claim 10, further comprising:
generate for display a plurality of real-life sports players associated with the fantasy sports team roster; and
visually distinguish the second real-life sports player with respect to the plurality of real-life sports players in response to determining that the second real-life sports player is a replacement for the first real-life sports player.

* * * * *

UNITED STATES PATENT AND TRADEMARK OFFICE
CERTIFICATE OF CORRECTION

PATENT NO. : 9,731,193 B2
APPLICATION NO. : 15/157832
DATED : August 15, 2017
INVENTOR(S) : Patrick J. Hughes et al.

Page 1 of 1

It is certified that error appears in the above-identified patent and that said Letters Patent is hereby corrected as shown below:

In the Claims

Claim 10, at Column 22, Line number 65, please delete "identifies" after identifying.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*